US010553210B2

United States Patent
Chung et al.

(10) Patent No.: US 10,553,210 B2
(45) Date of Patent: Feb. 4, 2020

(54) SYSTEM, APPARATUS, AND METHOD FOR PROCESSING NATURAL LANGUAGE, AND NON-TRANSITORY COMPUTER READABLE RECORDING MEDIUM

(71) Applicant: SAMSUNG ELECTRONICS CO., LTD., Suwon-si (KR)

(72) Inventors: Ji-hye Chung, Seoul (KR); Kyung-duk Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 15/212,758

(22) Filed: Jul. 18, 2016

(65) Prior Publication Data

US 2017/0069315 A1 Mar. 9, 2017

(30) Foreign Application Priority Data

Sep. 9, 2015 (KR) .................. 10-2015-0127692

(51) Int. Cl.
*G10L 15/22* (2006.01)
*G06F 17/27* (2006.01)

(52) U.S. Cl.
CPC .............. *G10L 15/22* (2013.01); *G06F 17/27* (2013.01); *G10L 2015/223* (2013.01)

(58) Field of Classification Search
CPC .................. G10L 2015/223; G10L 15/22
See application file for complete search history.

(56) References Cited

U.S. PATENT DOCUMENTS

| 6,101,468 A * | 8/2000 | Gould | G09B 19/04 704/251 |
| 6,604,075 B1 * | 8/2003 | Brown | H04M 3/4938 704/270.1 |
| 7,197,460 B1 * | 3/2007 | Gupta | G06F 3/167 704/270.1 |
| 8,000,974 B2 * | 8/2011 | Grant | G06F 3/167 704/201 |
| 8,219,407 B1 * | 7/2012 | Roy | G10L 15/19 704/275 |
| 8,719,009 B2 * | 5/2014 | Baldwin | G06Q 30/02 704/257 |
| 8,954,330 B2 * | 2/2015 | Koenig | G06F 17/271 704/270 |
| 9,412,392 B2 * | 8/2016 | Lindahl | G10L 15/30 |
| 9,548,050 B2 * | 1/2017 | Gruber | G06F 17/3087 |
| 9,570,086 B1 * | 2/2017 | Sanders | G10L 15/22 |
| 9,633,674 B2 * | 4/2017 | Sinha | G10L 15/22 |
| 9,966,065 B2 * | 5/2018 | Gruber | G06F 17/2705 |

(Continued)

FOREIGN PATENT DOCUMENTS

KR 10-1383552 B1 4/2014

*Primary Examiner* — Matthew H Baker
(74) *Attorney, Agent, or Firm* — Sughrue Mion, PLLC

(57) ABSTRACT

A system, apparatus, and method for processing a natural language, and a computer readable recording medium are provided. The system includes a user device configured to receive a compound or complex sentence and a natural language processing apparatus configured to generate a plurality of control commands for the user device based on whether operations intended by a user are sequentially performable in the compound or complex sentence received from the user device.

18 Claims, 18 Drawing Sheets

(56) References Cited

U.S. PATENT DOCUMENTS

| | | | | |
|---|---|---|---|---|
| 2004/0006480 A1* | 1/2004 | Ehlen | G10L 15/22 | 704/276 |
| 2005/0096913 A1* | 5/2005 | Coffman | G10L 15/22 | 704/275 |
| 2006/0047513 A1* | 3/2006 | Chen | H04M 1/7253 | 704/246 |
| 2007/0038436 A1* | 2/2007 | Cristo | G06F 17/273 | 704/9 |
| 2008/0077408 A1* | 3/2008 | Wang | G10L 15/265 | 704/275 |
| 2010/0169098 A1* | 7/2010 | Patch | | 704/275 |
| 2013/0080177 A1* | 3/2013 | Chen | G10L 15/26 | 704/275 |
| 2013/0297320 A1* | 11/2013 | Buser | B33Y 40/00 | 704/275 |
| 2014/0035823 A1* | 2/2014 | Khoe | G06F 3/02 | 345/171 |
| 2014/0244258 A1* | 8/2014 | Song | G10L 15/18 | 704/249 |
| 2014/0249817 A1* | 9/2014 | Hart | G10L 15/22 | 704/239 |
| 2014/0365226 A1* | 12/2014 | Sinha | G10L 25/00 | 704/275 |
| 2015/0348551 A1* | 12/2015 | Gruber | G06F 17/2705 | 704/235 |

\* cited by examiner

FIG. 4

Item 1

(a)
```
Input    record @movie show me @movie
Output   record @movie # show me @movie
```

Item 2

(b)
```
Input    record @movie and show me @movie
Output   record @movie # show me @movie
```

Item 3

(c)
```
Input    record @movie
Output   record @movie
```

FIG. 5

(a) WHO STARRED IN HARRY POTTER AND TURN ON KBS

⇩ NAMED ENTITY RECOGNITION (b) MOVIE = HARRY POTTER, CHANNEL NAME = KBS

⇩ SMT (c) WHO STARRED IN @MOVIE, TURN ON @CHANNEL NAME

⇩

(d) WHO STARRED IN @MOVIE # TURN ON @CHANNEL NAME

⇩

(e) WHO STARRED IN HARRY POTTER AND TURN ON KBS

SYSTEM, APPARATUS, AND METHOD FOR
PROCESSING NATURAL LANGUAGE, AND
NON-TRANSITORY COMPUTER READABLE
RECORDING MEDIUM

CROSS-REFERENCE TO RELATED APPLICATIONS

This application claims priority from Korean Patent Application No. 10-2015-0127692, filed on Sep. 9, 2015, in the Korean Intellectual Property Office, the disclosure of which is incorporated herein by reference in its entirety.

BACKGROUND

Field

Apparatuses and methods consistent with the exemplary embodiments relate to a system, apparatus, method for processing a natural language, and a non-transitory computer readable recording medium, and more particularly, to a natural language processing system, apparatus, and method that determine an appropriate system behavior for a user utterance of a compound sentence in the natural language processing system such as a spoken dialog system, a question answering system, or a chatting system and selectively process the system behavior according to whether a plurality of operations intended by a user are operations that may be sequentially processed in a system, e.g., in an image display apparatus, and a non-transitory computer readable recording medium.

Description of the Related Art

In general, a machine translation means that a computer system automatically converts a natural language sentence F of an input language into a natural language sentence E of a target language. A statistical machine translation of the machine translation learns a machine translation model based on training data and performs a machine translation based on the learned model. In more detail, the statistical machine translation is a process of finding E that makes probability Pr(E|F) of E maximum when F is given. In other words, E is a best translation result of F. This may be expressed as in Equation 1 below.

$$E^* = \mathrm{argmax}_E Pr(E|F) \quad (1)$$

Equation 2 may be acquired below by applying Bayes' rule to Equation 1 above to decompose Pr(E|F).

$$E^* = \mathrm{argmax}_E Pr(E)Pr(F|E) \quad (2)$$

Here, Pr(F|E) denotes a probability that a translation model will be translated into F when the translation model is given, i.e., indicates how appropriate the translation of E into F is. The translation model is learned based on training data about a bilingual language.

Pr(E) refers to a probability that E will appear as a language model in a corresponding language and indicates how natural E is. The language model is learned based on training data about a monolingual language.

An existing natural language processing system analyzes an input sentence into morpheme information, a syntax structure, semantics, etc. Here, one input sentence is a basic sentence having a minimum size or a sentence including a plurality of basic sentences, i.e., a complex sentence.

The basic sentences forming the complex sentence are connected to one another in various forms.

For example, there may be a natural language processing system that recognizes and performs a voice command associated with a TV program.

A TV user may utter a complex sentence "Record OCN news and show me Family Guy" by using a natural language processing system. In this complex sentence, basic sentences "Record OCN news" and "Show me Family Guy" are connected to each other through conjunction "and".

Also, in a few of languages such as Korean, when sentences are connected to one another by conjunctions, the sentences may be modified. The TV user may utter a complex sentence "Record Muhan Challenge and play 1 Night 2 Days" in the natural language processing system. In this complex sentence, basic sentences "Record Muhan Challenge" and "Play 1 Night and 2 Days" are connected to each other by conjunction "and".

The TV user may utter a complex sentence "Record OCN news and show me Family Guy" into the natural language processing system. This complex sentence is produced if the TV user consecutively utters two sentences without a conjunction.

However, the existing natural language processing system is difficult to process a complex sentence as described above, and thus a performance of the existing natural language processing system is degraded.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

The exemplary embodiments provide a natural language processing system, apparatus, and method that determine an appropriate system behavior for a user utterance of a compound sentence form in the natural language processing system such as a spoken dialog system, a question answering system, or a chatting system and selectively process the system behavior according to whether a plurality of operations intended by a user are operations that may be sequentially processed in a system, e.g., in an image display apparatus, and a non-transitory computer readable recording medium.

According to an aspect of an exemplary embodiment, a system for processing a natural language, includes a user device configured to receive a compound or complex sentence and a natural language processing apparatus configured to generate a plurality of control commands for the user device based on whether operations intended by a user are sequentially performable in the compound or complex sentence received from the user device.

According to another aspect of an exemplary embodiment, an apparatus for processing a natural language, includes a storage unit configured to store operation information associated with whether a plurality of operations intended by a user are sequentially performable in a compound or complex sentence, a communication interface unit configured to receive a compound or complex sentence uttered by the user, and a natural language processor configured to generate a plurality of control commands for a user device by determining whether the operations intended by the user are sequentially performable in the received compound or complex sentence, based on the stored operation information.

The natural language processor may divide the received compound or complex sentence into a plurality of short sentences and determine whether the operations intended by the user are operations sequentially performable in the short sentences.

The natural language processor may include an intention verifier configured to determine whether the operations intended by the user are sequentially performable in the short sentences, a dialog context manager configured to, in answer to the operations being determined as being sequentially performable, determining the operations intended by the user by checking a dialog context of the operations based on a stored dialog history, and a system behavior generator configured to generate a control command associated with the determined operations.

The system behavior generator may generate a system answer for performing a sub-dialog with the user to determine the operations.

In answer to the operations being determined as being sequentially unperformable, the system behavior generator may generate a control command for outputting a warning message and generate a control command for performing merely one previous operation.

The apparatus may further include a voice synthesizer configured to, in answer to a voice associated with the control command, being provided to the user, synthesize the control command and the voice.

The storage unit may include direction information, which sets orders of the plurality of operations, as the operation information.

According to another aspect of an exemplary embodiment, a method of processing a natural language, includes storing operation information associated with whether a plurality of operations intended by a user are sequentially performable in a compound or complex sentence, receiving a compound or complex sentence uttered by the user, and generating a plurality of control commands for a user device by determining whether the operations intended by the user are sequentially performable in the received compound or complex sentence, based on the stored operation information.

The method may further include dividing the received compound or complex sentence into a plurality of short sentences, and determining whether the operations intended by the user are operations sequentially performable in the short sentences.

The method may further include, in answer to the operations being determined as being sequentially performable, determining the operations intended by the user by checking a dialog context of the operations based on a stored dialog history. The generating of the control command may include generating a control command associated with the determined operations.

The generating of the control command may include generating a system answer for performing a sub-dialog with the user to determine the operations.

The generating of the control command may include, in answer to the operations being determined as being sequentially unperformable, generating a control command for outputting a warning message and generating a control command for performing merely one previous operation.

The method may further include, in answer to a voice associated with the control command, being provided to the user, synthesizing the control command and the voice.

The storing may include storing direction information, which sets orders of the plurality of operations, as the operation information.

According to another aspect of an exemplary embodiment, a non-transitory computer readable recording medium includes a program for executing a method of processing a natural language. The method may include storing operation information associated with whether a plurality of operations intended by a user are sequentially performable in a compound or complex sentence, receiving a compound or complex sentence uttered by the user, and generating a plurality of control commands for a user device by determining whether the operations intended by the user are sequentially performable in the received compound or complex sentence, based on the stored operation information.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWING FIGURES

The above and/or other aspects of the exemplary embodiments will be more apparent by describing certain exemplary embodiments with reference to the accompanying drawings, in which:

FIG. 4 illustrates basic and complex sentence parallel corpus information of FIG. 3, according to an exemplary embodiment;

FIG. 5 illustrates a modification example of an input sentence processed by a natural language processor of FIG. 2 or a natural language processing model of FIG. 3, according to an exemplary embodiment;

DETAILED DESCRIPTION OF THE EXEMPLARY EMBODIMENTS

Figure 1:
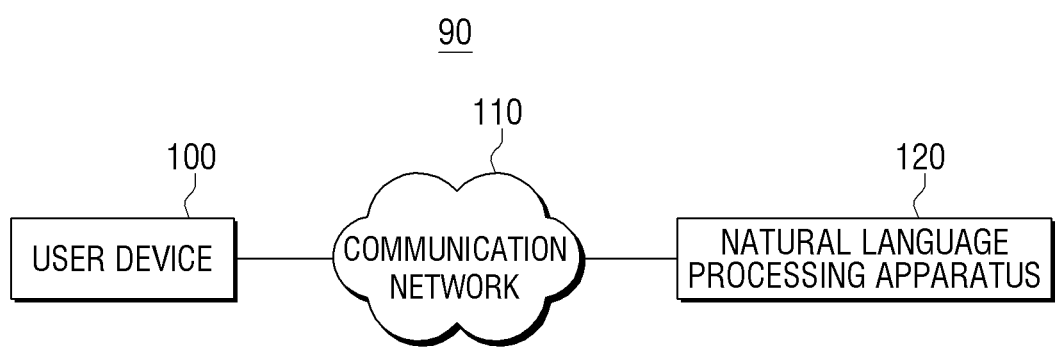
FIG. 1 is a block diagram of a configuration of a natural language processing system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the description of the exemplary embodiments with unnecessary detail.

Hereinafter, exemplary embodiments will be described in detail with reference to the attached drawings.

FIG. 1 is a block diagram of a natural language processing system 90, according to an exemplary embodiment.

As shown in FIG. 1, the natural language processing system 90 may include some or all of a user device 100, a communication network 110, and a natural language processing apparatus 120.

Here, the inclusion of some or all of elements means that at least one element selected from the communication network 110 and the natural language processing apparatus 120 is omitted, and thus the user device 100 performs a stand-alone natural language processing operation or is connected to a network device of the communication network 110 to perform the natural language processing operation. Also, the inclusion of some or all of the elements may mean that an element such as the communication network 110 is omitted, and thus the user device 100 and the natural language processing apparatus 120 may perform a direct communication (e.g., P2P). All of the elements may be described as being included to help sufficient understanding of the exemplary embodiments.

The user device 100 may include a display apparatus such as a digital television (DTV), a smartphone, a desktop computer, a laptop computer, a tablet personal computer (PC), a wearable device, etc. having searching, spoken-dialog, question answering, and chatting functions. Also, the user device 100 may include any apparatus having the above-mentioned functions not the display apparatus. For example, if question answering is assumed, the user device 100 receives a text or voice question through a search window or a microphone from a user who requests an answer and enables the received question to be provided to the natural language processing apparatus 120 through the communication network 110. Here, the user device 100 may provide a text-based recognition result to the natural language processing apparatus 120. For example, if a voice is received as a question, the user device 100 may receive a voice question through a voice receiver such as a microphone, recognize the received voice question by using a utterance engine such as "*-Voice", i.e., a program, and output a text-based recognition result.

However, the natural language processing apparatus 120 may have a superior performance to the user device 100, and thus the text-based recognition result may be generated by the natural language processing apparatus 120. In other words, the user device 100 transmits merely a voice signal received through the microphone, and the natural language processing apparatus 120 generates a voice recognition and the text-based recognition result based on the received voice signal. Therefore, the present exemplary embodiment does not particularly limit how to process a recognition result.

According the present exemplary embodiment, the user device 100 may receive various types of questions from the user. Here, the receiving of the various types of questions refers to simply receiving of words and sentences. However, to be more accurate, the receiving of the various types of questions may refer to receiving of one word, a plurality of words, or a sentence. Here, in the present exemplary embodiment, the receiving of various types of questions may refer to the receiving of the sentence. Here, the sentence may include a short (or simple) sentence form, a compound sentence form, a complex sentence form, or a combination thereof. Also, the form may include the compound sentence and another case similar to the compound sentence. Also, if two sentences are in an interdependent relationship by a relative pronoun in the complex sentence, the complex sentence according to the present exemplary embodiment refers to a compound sentence or a compound form sentence. For example, "Record OCN news" and "Show me Family Guy" respectively correspond to short sentences. If the short sentences are connected to each other by a conjunction such as a coordinate conjunction or the like, the short sentences form a compound sentence. In other words, "Record OCN news and show me Family Guy" corresponds to a compound sentence.

However, such a conjunction may be changed into various forms. Sentences such as "Record OCN news and show me Family Guy" and "Show me Family Guy after recording OCN news" correspond to examples of the various forms. As described above, a conjunction may be changed into various forms. In addition, two sentences may be consecutively provided at preset time intervals without a conjunction. For example, two short sentences such as "Record OCN news" and "show me Family Guy" are continuously provided. According to the present exemplary embodiment, the user device 100 may receive various forms of compound sentences as described above as text forms or voice forms.

As described above, the user device 100 may be provided with an answer as a plurality of sentences having original sentence forms, e.g., short sentences, from the natural language processing apparatus 120 to receive a user command (or a voice command), according to whether a sentence provided from the user is short sentences or a compound sentence. For example, in a case of "Record OCN news and show me Family Guy", the user device 100 may receive the answer in two short sentence forms "Record OCN news" and "show me Family Guy". Here, the two short sentence forms may be provided in the same language but may be provided in different languages. This may be useful in a chatting situation between users using different languages. As described above, the user device 100 may easily perform an operation of a question uttered by the user by receiving a compound sentence provided from the user in a short sentence form recognizable by the user device 100 through the natural language processing apparatus 120.

The user device 100 will be described later in more detail. However, if the user device 100 includes some or all of free utterance engines, before performing operations intended by the user in a plurality of short sentences provided by the natural language processing apparatus 120, the user device

100 may determine whether the intended operations (or tasks) are operations sequentially performable by the user device 100 through an uttered compound sentence and appropriately operate according to the determination result. For example, the user device 100 may be a TV. The user may utter a voice command of a compound form to operate the TV, but the uttered voice command may not be seen as being appropriate for operating the TV. In other words, a user may utter a compound sentence "Turn off TV and mute". A subsequent behavior "mute" corresponds to a meaningless behavior. As described above, the user device 100 may check an intention of a voice command of a compound sentence form inappropriately uttered by the user through the voice command, determine that the intention is inappropriate for a system behavior, notify the user about this in a message form, and perform merely a previous behavior.

The communication network 110 includes all of wire and wireless communication networks. Here, the wire communication network 110 includes an internet network such as a cable network, a Public Switched Telephone Network (PSTN), or the like, and the wireless communication network includes a code division multiple access (CDMA), a wideband code division multiple access (WCDMA), Global System/Standard for Mobile Communications (GSM), an Evolved Packet Core (EPC), Long Term Evolution (LTE), Wireless Broadband Internet (WiBro), or the like. The communication network 110 according to the present exemplary embodiment is not limited thereto and thus may be used as an access network of a next generation mobile communication system, which will be realized, in a cloud computing network or the like under a cloud computing environment. For example, if the communication network 110 is the wire communication network, an access point (AP) of the communication network 110 may access an exchange office or the like of a telephone company. However, if the communication network 110 is the wireless communication network, the AP may process data by accessing a Service General Packet Radio Service (GPRS) Support Node (SGSN) or a Gateway GPRS Support Node (GGSN) operated by a communication company or process data by accessing various types of repeaters such as Base Station Transmission (BTS), NodeB, e-NodeB, etc.

The communication network 110 may include an AP. The AP includes a small base station such as a femto or pico base station that is frequently installed in a building. Here, the femto or pico base station is classified according to how many user devices 100 may be maximally accessed according to classification of small base stations. The AP includes a short-range communication module for performing a short-range communication, such as Zigbee, Wi-Fi, or the like, with the user device 100. The AP may use Transmission Control Protocol/Internet Protocol (TCP/IP) or Real-Time Streaming Protocol (RTSP) for a wireless communication. Here, the short-range communication may be performed according to various types of standards such as Bluetooth, Zigbee, Infrared Data Association (IrDA), Radio Frequency (RF) such as Ultra High Frequency (UHF) and Very High Frequency (VHF), ultra wideband (UWB), etc. besides WiFi. Therefore, the AP may extract a location of a data packet, designate a best communication path of the extracted location, and transmit the data packet along the designated communication path to a next device, e.g., the user device 100. The AP may share several lines in a general network environment, e.g., may include a router, a repeater, a relay, etc.

The natural language processing apparatus 120 rapidly estimates a boundary between two sentences of an input sentence received in a short or compound form sentence from the user device 100, in more detail, a compound form sentence, and uses a simplified machine language for this. Here, the simplified machine language may be a language that is internally used to rapidly change an input compound sentence into divided short sentence forms. This will be described later in more detail. For example, if the natural language processing apparatus 120 receives a compound sentence "Who starred in Harry Potter and turn on KBS" and a sentence "Who starred in Gone with the Wind and turn on KBS" from the user, the natural language processing apparatus 120 determines that "Harry Potter" and "Gone with the Wind" belong to a named entity category (or a named entity attribute, a named entity type, or the like) named movie through learning, equally changes (or replaces or translates) "Harry Potter" and "Gone with the Wind" into a form "Who starred in @movie", rapidly applies a statistical translation technique based on this, and divide and generate a plurality of short sentences. Here, the named entity category refers to a category to which named entity words of a sentence belong. A named entity, i.e., a name of a word, may be "Harry Potter" or "Gone with the Wind" as a movie name, "OCN" as a channel name, "*Bama", or the like as a character. A category to which this named entity belongs may be classified into a movie, a channel name, a character, etc. However, a category of the named entity "Harry Potter" may be a character in another sentence.

Here, when various forms of compound sentences, in more detail, a compound sentence on which a named entity category is tagged, is referred to as A, the statistical (machine) translation technique outputs a compound sentence B trained (or learned) for A. In other words, as a processing result of sentence A, sentence B of a form where several short sentences are connected to one another by a particular identifier is generated. For example, a form, such as "Record @ movie # show me @ movie" into which a sentence classification symbol is inserted, may be an identifier of two short sentences of the compound sentence B. Based on this sentence classification symbol, the natural language processing apparatus 120 may estimate a boundary between two short sentences, generate two short sentences B "Record Harry Potter" and "Show me Gone with the Wind" based on the boundary, provide the two short sentences B to the user device 100 or change the two short sentences B into another language, and provide the changed two short sentences B to the user device 100. Alternatively, the natural language processing apparatus 120 may translate two short sentences into another language, connect the translated two short sentences, and provide the connected two short sentences to the user device 100. Here, an identifier has been described as a symbol but may be a bit information form. Therefore, the identifier may not be particularly limited. Also, when considering that an ungrammatical change or a word order change may occur according to a translation result, "Record @ movie # show me @ movie" may be changed into "Record @ movie # show me @ movie". Therefore, the present exemplary embodiment may not be particularly limited to an output form of the above result.

For example, if a sentence is provided in a text form through a search window of the user device 100, the natural language processing apparatus 120 may use the corresponding text sentence as it is. However, if a voice is uttered so as to provide a voice signal, the natural language processing apparatus 120 may acquire and use a corresponding voice sentence as a text-based recognition result by using an internal free utterance engine. If the user device 100 recognizes this voice sentence and provides a text-based result, this process may be omitted. Therefore, the present exemplary embodiment may not limit a form of a sentence that the natural language processing apparatus 120 receives from the user and forms of two divided short sentences provided to the user device 100.

In more detail, the natural language processing apparatus 120 according to the present exemplary embodiment may pre-store named entity corpus information for determining a category of a named entity of an input sentence, i.e., an attribute of the named entity. For example, "Harry Potter" may be a movie in an input sentence but may be referred to as a person. Therefore, the natural language processing apparatus 120 rapidly classifies a category of a named entity from a corresponding input sentence by performing training and learning based on stored named entity corpus information. In other words, the natural language processing apparatus 120 may learn a named entity recognition model based on the named entity corpus information and rapidly automatically find named entity categories of various input short or compound sentences based on the learned named entity recognition model. This process is a named entity recognition process.

The natural language processing apparatus 120 may pre-store various types of parallel corpus information where short sentences and compound sentences are mixed, in order to apply a compound sentence, on which a named entity, in more detail, a named entity category, is tagged, to a statistical translation technique. Training may be performed for pieces of parallel corpus information so as to change an input sentence, i.e., a sentence of a form replaced in an internal machine language according to the present exemplary embodiment, into divided short sentences. For example, the natural language processing apparatus 120 performs training for the statistical translation model based on the parallel corpus information, and divides and restores the input sentence, on which the named entity category is tagged, into a plurality of basic sentences based on the trained statistical translation model.

Here, restoring refers to a process of finding an original sentence of the input sentence changed into various forms mentioned above. For example, the statistical translation model trained by input corpus information may immediately output the plurality of basic sentences through a mathematical algorithm or an execution of a program. This restoring may also enable various types of operations. For example, when an input compound sentence is replaced with a named entity category, a corresponding named entity is known through additional storing, and thus the input compound sentence is changed into a named entity before being changed from divided sentences into the replaced named entity category. Also, in a case of Korean, a final ending may be appropriately changed based on a mathematical algorithm or information stored in a database (DB). For example, as a result of searching a DB, if information is matched so as to be changed into "after", "and", or "please", the corresponding information may be changed. However, in the exemplary embodiments, this operation may be processed by a translation model. As described above, various methods may be used for restoring, and thus the restoring may not be particularly limited to the above-described contents.

In summary, in the present exemplary embodiment, in a system training stage, a sentence including a plurality of basic sentences, i.e., a complex or compound sentence, is automatically or manually formed (or built in a dictionary) from basic sentences, i.e., short sentences, and then the statistical translation model is learned based on training data where a list of basic sentences and a complex sentence are paired. In a system execution stage, a trained statistical translation model may be applied to an input sentence so as to divide and restore a plurality of basic sentences from a complex sentence.

As described above, the natural language processing apparatus 120 outputs trained corpus information to an input sentence by applying a statistical translation model, and divides and restore the input sentence based on this. For this, the natural language processing apparatus 120 determines a named entity category to improve a performance and executes a statistical translation model based on this. However, in the present exemplary embodiment, not the statistical translation model but additional corpus information trained for the statistical translation model may be pre-stored and used in a DB. In other words, matched corpus information is extracted by determining a named entity category from an input sentence, i.e., a short sentence or a compound sentence, and searching the DB based on the determined named entity category. Also, a plurality of short sentences may be divided and restored based on an identifier of the extracted corpus information. Therefore, the present exemplary embodiment may not be particularly limited to the above translation model.

Also, the natural language processing apparatus 120 may determine whether the input sentence is a short sentence or a compound sentence and then process the input sentence according to different methods. For example, an existing natural language processing method may be used for a short sentence, and a technique according to the present exemplary embodiment may be applied merely to a compound sentence. Therefore, cost for building a system may be saved. However, in the present exemplary embodiment, for efficiency, the system may be designed so as to process all of a short sentence or a compound sentence when the short sentence or the compound sentence is provided as an input sentence.

According to the configuration result, in the present exemplary embodiment, a long and complex input sentence may be divided and restored into a plurality of short sentences, and thus a performance of the system may be improved. In other words, the system that may perform merely existing short sentence-based processing may perform processing of all of a short sentence and a compound sentence, and thus the performance of the system may be increased.

Also, in the present exemplary embodiment, an interactive interface that may process a user utterance of a compound sentence form may be provided so as to enable the user to achieve a purpose such as an information search, a device manipulation, or the like, through an everyday language form utterance.

Figure 2:
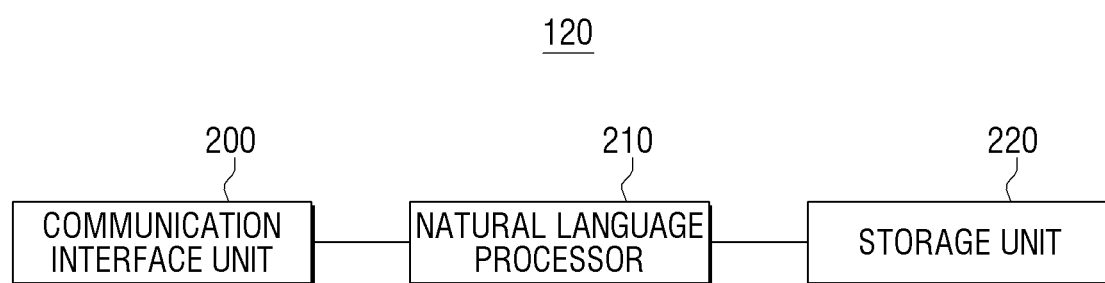
FIG. 2 is a block diagram of a detailed configuration of a natural language processing apparatus of FIG. 1, according to an exemplary embodiment.

FIG. 2 is a block diagram of a detailed configuration of the natural language processing apparatus 120 of FIG. 1, i.e., illustrates the natural language processing apparatus 120 that is divided into hardware pieces.

Referring to FIG. 2 along with FIG. 1, for convenience of description, the natural language processing apparatus 120 according to the present exemplary embodiment includes some or all of a communication interface unit 200, a natural language processor 210, and a storage unit 220.

Here, the inclusion of some or all of elements means that some elements such as the communication interface unit 200 may be omitted or some elements such as the storage unit 220 may be integrated into another element such as the natural language processor 210. Therefore, all of the elements may be described as being included to help sufficient understanding of the exemplary embodiments.

The communication interface unit 200 receives a natural language having a short or compound sentence form provided by the user device 100. Here, the corresponding natural language may be a sentence that is provided by an operation such as searching, question answering, or chatting of the user device 100. Also, searching or question answering may be performed through a voice recognition. In this case, a text-based recognition result may be provided as an input sentence. However, if a voice signal is simply input, the voice signal is provided to the natural language processor 210 so as to generate the text-based recognition result.

The communication interface unit 200 may provide the input natural language to the natural language processor 210 and transmit a result processed by the natural language processor 210 to the user device 100 under control of the natural language processor 210. Here, the processed result may provide an input complex sentence, i.e., a compound sentence, as a plurality of divided short sentences in the same language. Alternatively, the input complex sentence, i.e., the compound sentence, may be a plurality of short sentences that are changed into another language. In addition, the plurality of short sentences that are changed into another language may be connected and provided by a conjunction, i.e., a conjunction of an initially input complex sentence. The conjunction may be the same as a corresponding translation language. For example, Korean word "~고" or "그리고" may be changed into English word "or" or "and". Based on this, the user device 100 may perform an operation, question answering, or a chatting operation according to a voice utterance of the user.

The natural language processor 210 performs a named entity recognition operation with respect to various forms of input compound sentences. For example, as described above, a category of a named entity of an input sentence is determined based on named entity corpus information stored in the storage unit 220 and a recognition model trained for the named entity corpus information. Here, in the present exemplary embodiment, in the input sentence, "Harry Potter" or "Gone with the Wind" belongs to a category of movie.

Also, the natural language processor 210 may change the input compound sentence into a machine language for applying the input compound sentence to a statistical translation model by using category information of each named entity. In other words, if a compound sentence "Record Harry Potter and show me Gone with the Wind" is input, "Harry Potter" and "Gone with the Wind" belong to a category of movie. Therefore, the compound sentence may be replaced, i.e., changed into a form "Record @ movie, show me @ movie". This data may be processed in a form of bit information using "0" and "1". This data may be changed by a system designer or the like and thus may not be particularly limited. In other words, if the data is processed as bit information, the data may be more useful even if not a mathematical translation model but a DB is used.

For example, if a compound sentence "Record Harry Potter and show me Ghost" is input, the natural language processor 210 may replace the compound sentence with the same data information as the above data. In other words, according to the present exemplary embodiment, a named entity is not accurately recognized through a named entity recognition process, but an input compound sentence is rapidly divided into a plurality of short sentences through generalized category information and a statistical translation technique.

As described above, the natural language processor 210 may extract complex sentence corpus information of an input sentence, on which category information is tagged, by applying a trained statistical translation model to basic and complex sentence parallel corpus information and generate a plurality of short sentences based on the complex sentence corpus information. For example, the natural language processor 210 outputs "Record @ movie # show me @ movie" for "Record @ movie" and "show me @ movie" by applying a translation model. Therefore, the natural language processor 210 determines a boundary of a sentence based on this and generates two independent short sentences according to the determination result. For example, the natural language processor 210 generates two short sentences "Record Harry Potter" and "show me Gone with the Wind".

As described above, the natural language processor 210 may learn category information of a named entity of an input sentence, replace the category information into a machine language, and apply replaced information, i.e., the machine language, to a statistical translation model so as to rapidly perform processing of the input sentence.

As described above, the natural language processor 210 outputs a result through a mathematical algorithm such as a named entity recognition model or a statistical translation model. In other words, these models are models that are trained for various types of information and thus may rapidly output results of various forms of input sentences. However, as mentioned above, in the present exemplary embodiment, information of a named entity category may extracted by searching a DB for a named entity. Here, associated corpus information may be extracted by re-searching a DB that stores corpus information for extracted information about a plurality of named entity categories. Also, a sentence may be divided and restored based on identification information of the extracted corpus information and thus may not be particularly limited to the above-described contents in the present exemplary embodiment.

Also, the natural language processor 210 according to the present exemplary embodiment may simply divide a voice command of a compound sentence form into two short sentences and analyze operations intended by the user. The natural language processor 210 according to the present exemplary embodiment may determine whether the operations intended by the user are sequentially performable. In other words, the natural language processor 210 determines whether the user inappropriately utters a voice command and appropriately generates a system behavior according to the determination result. Here, "generating of the system behavior" refers to generating and transmitting information (or a control command) that enables a TV to perform an operation. Therefore, the system behavior may refer to an operation of the TV. For example, the natural language processor 210 may transmit information for outputting a message for informing the user that there is an utterance inappropriate for the user as a system behavior and transmit information for further outputting a message for questioning whether to perform merely a previous operation. If there is an approval of the user, the user device 100 may perform merely the previous operation.

In this case, the natural language processor 210 may further perform various types of operations before generating a system behavior. For example, the user may utter a voice command of a compound sentence form "Alarm-reserve Muhan Challenge and play it". In this case, two short sentences "Alarm-reserve Muhan Challenge" and "play it" may be generated, and the natural language processor 210 may determine what a demonstrative pronoun "it" designates. For this, the natural language processor 210 may answer and question the user to determine whether the demonstrative pronoun designates "Muhan Challenge" in a previous operation. If the user answers that the demonstrative pronoun does not designate "Muhan Challenge", the natural language processor 210 may determine whether there is a similar situation to this, with reference to a previous broadcasting hearing history of the user. Therefore, the natural language processor 210 estimates that the user may refer to a channel. Therefore, the user may ask a question "Do you want to change channel?" for re-checking. As described above, the natural language processor 210 may generate a system behavior for satisfying an intention of the user with reference to a dialog context or history of the user.

The natural language processor 210 may include a controller and a natural language processing unit (or a natural language processing executor) that are divided in terms of hardware, and the controller may include a processor (e.g., a central processing unit (CPU)) and a memory that are physically divided. The natural language processing unit may include a program for executing natural language processing according to the present exemplary embodiment. Therefore, the CPU may perform a natural language processing execution operation by coping the program of the natural language processing unit into the memory in an initial operation of the system. Although this operation is not performed, the CPU may execute the natural language processing unit and receive merely a processing result. Therefore, the present exemplary embodiment may not be particularly to the above-described contents. This will be described in more detail later.

The storage unit 220 includes hardware such as a memory or a DB and a software storage such as a registry. The storage unit 220 may store named entity corpus information, and basic and compound sentence parallel corpus information as mentioned above. This information is actually output under control of the natural language processor 210. However, the storage unit 220 may provide all pieces of corresponding information in the initial operation of the system according to a request of the natural language processor 210 so as to enable the all pieces of the corresponding information to be stored in a storage of the natural language processor 210. Therefore, the present exemplary embodiment may not particularly limit a method of processing information. In this point, the storage unit 220 may be omitted from a configuration of an apparatus to be integrated into the natural language processor 210.

The communication interface unit 200, the natural language processor 210, and the storage unit 220 are formed of hardware modules that are physically separated from one another. However, the hardware modules may respectively store and execute software for performing the above-described operations. The corresponding software is a set of software modules, each of which may be formed of software, and thus may not be particularly to a configuration such as software or hardware. For example, the storage unit 220 may be a storage or a memory that is hardware. However, the storage unit 220 may reposit information in terms of software and thus may not be particularly limited to the above-described contents.

Other detailed contents will be described with reference to FIGS. 3 and 4.

Figure 3:
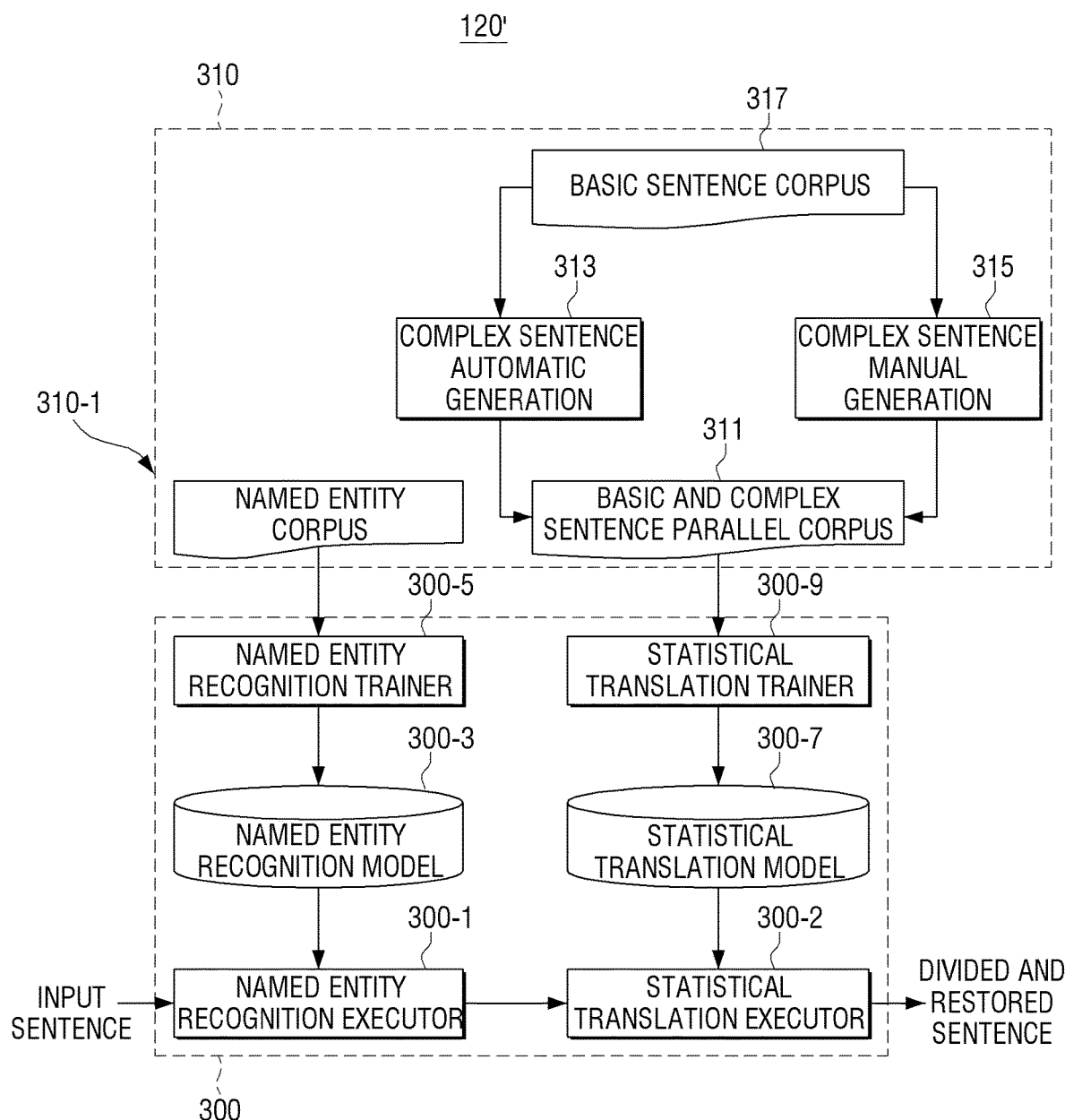
FIG. 3 is a block diagram of a detailed configuration of the natural language processing apparatus of FIG. 1, according to another exemplary embodiment.

FIG. 3 is a block diagram of a detailed configuration of a natural language processing apparatus 120', according to another exemplary embodiment, i.e., illustrates a software configuration of the natural language processing apparatus 120'. FIG. 4 illustrates basic and compound sentence parallel corpus information of FIG. 3, according to an exemplary embodiment.

For convenience of description, referring to FIG. 3 along with FIG. 1, the natural language processing apparatus 120' according to the present exemplary embodiment may include a natural language processing module 300 and a storage module 310. The natural language processing module 300 and the storage module 310 may respectively correspond to the natural language processor 210 and the storage unit 220 of FIG. 2.

In comparison with functions of the natural language processing module 300 and the storage module 310 with functions of the natural language processor 210 and the storage unit 220 of FIG. 2, the natural language processing module 300 may correspond to the communication interface unit 200 and the natural language processor 210 of FIG. 2, and the storage module 310 may correspond to the storage unit 220 of FIG. 2.

According to the present exemplary embodiment, the natural language processing module 300 may include merely a named entity recognition executor 300-1 and a statistical translation executor (or a translation executor) 300-2. However, the natural language processing module 300 may further include some or all of a named entity recognition model 300-3, a named entity recognition trainer 300-5, a statistical translation model 300-7, and a statistical translation trainer 300-9. Here, the inclusion of some or all of elements is the same as the above-described meaning.

The named entity recognition executor 300-1 automatically finds a named entity from an input sentence, in more detail, a category of the named entity, based on the named entity recognition model 300-3. For example, the named entity recognition executor 300-1 automatically finds words "Harry Potter" as a movie from a sentence "Do you know who starred in Harry Potter?".

For this, the named entity recognition trainer 300-5 learns (or trains) the named entity recognition model 300-3 so as to perform a named entity recognition based on a named entity corpus included in the storage module 310, i.e., corpus information 301-1.

For this named entity recognition training, a named entity corpus, i.e., the corpus information 310-1, generated by a system designer, a user, or the like is required. The named entity corpus 310-1 may include lists of sentences where parts corresponding to named entities are indicated as named entity tags. For example, the sentence "Who starred in <movie>Harry Potter</movie>?" of a named entity name corpus means that words "Harry Potter" belong to a named entity category referred to as "movie".

Also, the statistical (machine) translation executor 300-2 divides and restores a sentence, on which a named entity category is tagged, into a plurality of basic sentences, and outputs the plurality of basic sentences based on the statistical translation model 300-7. For example, the statistical translation executor 300-2 divides and restores a compound sentence "Record @movie and show me @movie" into basic sentences "Record @movie" and "show me @movie". In this process, the statistical translation executor 300-2 may convert the compound sentence into an original sentence form and output the original sentence form. In other words, the statistical translation executor 300-2 may output sentences of original forms "Record Harry Potter" and "show me Gone with the Wind".

Also, if a plurality of basic sentences "@movie 녹화하고 @movie 들어줘" in Korean are formed into one complex sentence, i.e., a compound sentence, and are themselves changed, the statistical translation executor 300-2 may divide and restore the plurality of basic sentences into basic sentences "Record @movie" and "show me @movie", and output the basic sentences.

Also, if a basic sentence, i.e., a short sentence, is input, the statistical translation executor 300-2 may maintain the one basic sentence as it is. Even in this case, the one basic sentence may be provided based on the statistical translation model 300-7 trained for the basic and complex sentence parallel corpus information 311.

For the above execution, the statistical translation executor 300-2 replaces a named entity value of an input sentence corresponding to a part corresponding to a named entity of a sentence of the basic and complex sentence parallel corpus information 311 with a named entity category. For example, if "OCN news" is a movie named entity category in a sentence "Record OCN news", the sentence "Record OCN news" is changed into a sentence "Record @movie".

Here, the named entity change is to increase a performance of a statistical translation for combining words forming a named entity into one to divide and restore a sentence. This has been sufficiently described above.

For the above-described execution, the natural language processing module 300 trains the statistical translation model 300-7 through the statistical translation trainer 300-9. For this, the basic and complex sentence parallel corpus information 311 is required.

The basic and complex sentence parallel corpus information 311 pairs a plurality of basic sentences and one complex sentence corresponding to the plurality of sentences to form a list. This is as shown in FIG. 4. In (a) through (c) of FIG. 4, an input corresponds to one complex sentence in a list. This is changed information. Also, an output corresponds to a plurality of basic sentences matching with the changed information. Also, item 1 indicates a case where a complex sentence is changed and input without a conjunction, and item 2 is an example of a complex sentence including a conjunction "and". Also, item 3 indicates a case where a short sentence is input. As mentioned above, the basic and complex sentence parallel corpus information 311 may be stored in a form of 2 bit information in a DB.

As shown in FIG. 4, a plurality of basic sentences of the basic and complex sentence parallel corpus information 311 are connected to one another by a particular sentence boundary classification symbol such as "#". For example, "Record OCN news # show me Family Guy" is formed by connecting two sentences "Record OCN news" and "show me Family Guy".

The basic and complex sentence parallel corpus information 311 is automatically or manually generated from basic sentence corpus information 317 (313 and 315). The basic sentence corpus information 317 is formed of a list of basic sentences. For example, "Record OCN news" is one basic sentence. The basic corpus information 317 may be built separately from named entity corpus information 310-1, and the same storage module may be formed for the basic corpus information 317.

A complex sentence automatic generation module 313 automatically generates a complex sentence by connecting two or more basic sentences of the basic sentence corpus information 317. For example, a complex sentence "Record OCN news and show me Family Guy" is automatically generated by connecting a basic sentence "Record OCN news" and a basic sentence "show me Family Guy".

However, a system designer or the user may automatically generate a complex sentence, which is difficult to be generated by the complex sentence automatic generation module 313, by using a complex sentence manual generation module 315. In the complex sentence manual generation process, the system designer or the user manually generates a complex sentence based on two or more basic sentences of the basic sentence corpus information 317. Also, in the complex sentence manual generation process, the system designer may directly think out a basic sentence and manually generate the complex sentence based on the basic sentence. As described above, the basic and complex sentence parallel corpus information 311 may be built in various forms. Therefore, in the present exemplary embodiment, a method of building information may not be particularly limited.

The statistical translation trainer 300-9 trains the statistical translation model 300-7 based on the basic and complex sentence parallel corpus information 317.

Also, the statistical translation executor 300-2 restores an input short sentence or divides and restores a compound sentence, and outputs the short sentence or the compound sentence based on a trained statistical translation model.

According to the configuration result, the natural language processing module 300 may perform a named entity recognition with respect to an input sentence such as a compound sentence, perform a statistical translation based on the performance result to divide a complex sentence, and generate a plurality of restored basic sentences to improve a performance of a natural language processing system 110'.

Concepts of training and execution performed in FIG. 3 will now be described in more detail.

The execution mentioned in FIG. 3 indicates that a machine, i.e., an apparatus, receives any input, and find and outputs what a person wonders about. For example, in a case of an emotion recognition of seeing a face of a person to find an emotion, an input may be referred to as the face of the person, and an output may be referred to as the emotion (e.g., happiness, sadness, . . . ) of the person. If a statistical-based approach method is selected for this execution, the execution may include an algorithm and a model. The algorithm is included in an executor, and the model describes a relation between an input and an output. For example, which face a person makes when being happy or which face the person makes when being sad is a kind of model and is mathematically expressed. The algorithm describes a process of seeing a face of the person to find an emotion based on this model.

As described above, the execution is to enable a machine to receive an input, and find and output what the person is curious about. Training enables the machine to receive an input and an output so as to build a model of a relation between the input and output. For this training, the person may directly make training data including a pair of an input and an output. For example, if there are 1000 face images, and an emotion, etc. of a person expressed by a person face of each of the 1000 face images is recorded, this recording becomes training data of inputting a face image and outputting an emotion. This data is referred to as a corpus in the field of natural language processing.

Hereinafter, a named entity recognition and a (machine) translation will be described in terms of training and execution.

The named entity recognition means that "Gone with the Wind" is a named entity of a movie category (or type) in a sentence "Show me start time of Gone with the Wind". In other words, an input may be a natural language sentence, and an output may be a named entity category. Named entity categories managed by Samsung Electronics TVs may be a movie title, a movie genre, an actor, a time, etc.

Therefore, for example, the named entity corpus information 310-1 may be formed into a sentence onto which a type of a named entity is attached. For example, the named entity corpus information 310-1 may be expressed as follows.

Show me/Dead Poets Society/movie/start time.
Show me/Gladiator/movie/start time
What is the program showing/today/time//Yoo*seok/actor/

In this case, the named entity recognition trainer 300-5 builds the named entity recognition model 300-3 of a relation between a sentence and a named entity based on a named entity corpus as described above. In the above training data, a phrase such as "Show me start time" appears on right side of a named entity indicating a movie name. This knowledge may be, for example, mathematically expressed.

The named entity recognition executor 300-1 finds a named entity, i.e., a named entity category, based on the named entity recognition model 300-3 when an input sentence is given.

A (machine) translation for dividing and restoring a sentence will now be described. For example, the (machine) translation means that a particular language sentence "Train is fast" is changed into another language sentence "Train is fast." However, the present exemplary embodiment of the aims at dividing a complex sentence "Record OCN news and show me Family Guy" into several basic sentences "Record OCN news" and "show me Family Guy". Therefore, in order to systematically express this process, several basic sentences are expressed as a sentence, a boundary of which is divided by using a symbol "#", as in "Record OCN news # show me Family Guy".

In other words, an input may be referred to as a complex sentence, and an output may be referred to as a plurality of basic sentences. Here, a named entity recognition technology as mentioned above is applied to a sentence that is to be translated, i.e., changed. For example, "OCN news" and "Family Guy" are determined as program names (movie) from a sentence "Record OCN news and show me Family Guy" so as to change "Record OCN news and show me Family Guy" into "Record @movie and show me @movie". The named entity recognition technology is applied to prevent a sentence boundary from being divided in a named entity (e.g., prevent the sentence boundary from being divided between "Family" and "Guy"). Also, the named entity recognition technology is applied to generalize and express different words having the same meanings like movie named entities so as to increase an accuracy in terms of machine translation.

The basic and complex sentence parallel corpus information 311 includes an input and an output of a translation and is automatically and manually generated. A basic and complex sentence parallel corpus may be arranged as in Table 1 below. Table 1 below includes contents of FIG. 4.

TABLE 1

| Input | Output |
| --- | --- |
| record @movie show me @movie | record @movie # show me @movie |
| record @movie and show me @movie | record @movie # show me @movie |
| record @movie | record @movie |
| who starred in @movie ? | who starred in @movie ? |

The statistical translation trainer 300-9 builds the statistical translation model 300-7 of a relation between an input sentence and an output sentence based on a corpus as mentioned above. In the above training data, "and" is changed (or translated) into "#" between "record @movie and show me @ movie", and other words are changed into themselves, and this knowledge is mathematically expressed. This knowledge may be expressed as 2-bit information, and this form may be stored and used in a DB.

The statistical translation executor 300-2 divides and restores a complex sentence into several basic sentences by performing a translation process based on the statistical translation model 300-7 when an input sentence is given. Here, the input sentence is a sentence where a named entity, i.e., a named entity category, is found by the named entity recognition executor 300-1 to be changed.

FIG. 5 illustrates a modification example of an input sentence that is processed by the natural language processor 210 of FIG. 2 or the natural language processing module 300 of FIG. 3, according to an exemplary embodiment.

For convenience of description, referring to FIG. 5 along with FIG. 3, the named entity recognition executor 300-1 of FIG. 4 may receive a sentence "Who starred in Harry Potter and play KBS" as in (a) of FIG. 5.

In this case, the named entity recognition executor 300-1 automatically finds a named entity category of a named entity of an input sentence through the named entity recognition model 300-3 as in (b) of FIG. 5. Therefore, the named entity recognition executor 300-1 acquires information that "Harry Potter" is a movie, and "KBS" is a channel name. Providing of named entity category information as described above like an input sentence may be referred to as an input sentence on which a named entity name, i.e., a named entity category, is tagged in the present exemplary embodiment.

Also, the statistical translation executor 300-2 of FIG. 3 changes a named entity into a named entity type in the input sentence. Therefore, as in (c) of FIG. 5, the input sentence is changed into a sentence "Who starred in @movie and play @channel name".

In this case, the statistical translation executor 300-2 may generate (or extract) a sentence "Who starred in movie # play @channel name" through the statistical translation model 300-7 as in (d) of FIG. 5.

Based on this, the statistical translation executor 300-2 generates and outputs original sentences of basic sentences, i.e., sentences "Who starred in Harry Potter" and "play KBS", by determining a boundary of basic sentences based on a sentence classification symbol "#" as an identifier classifying a boundary of a sentence.

This process may be that the statistical translation executor 300-2 divides an input sentence and simultaneously restores an original sentence, i.e., a basic sentence.

Figure 6:
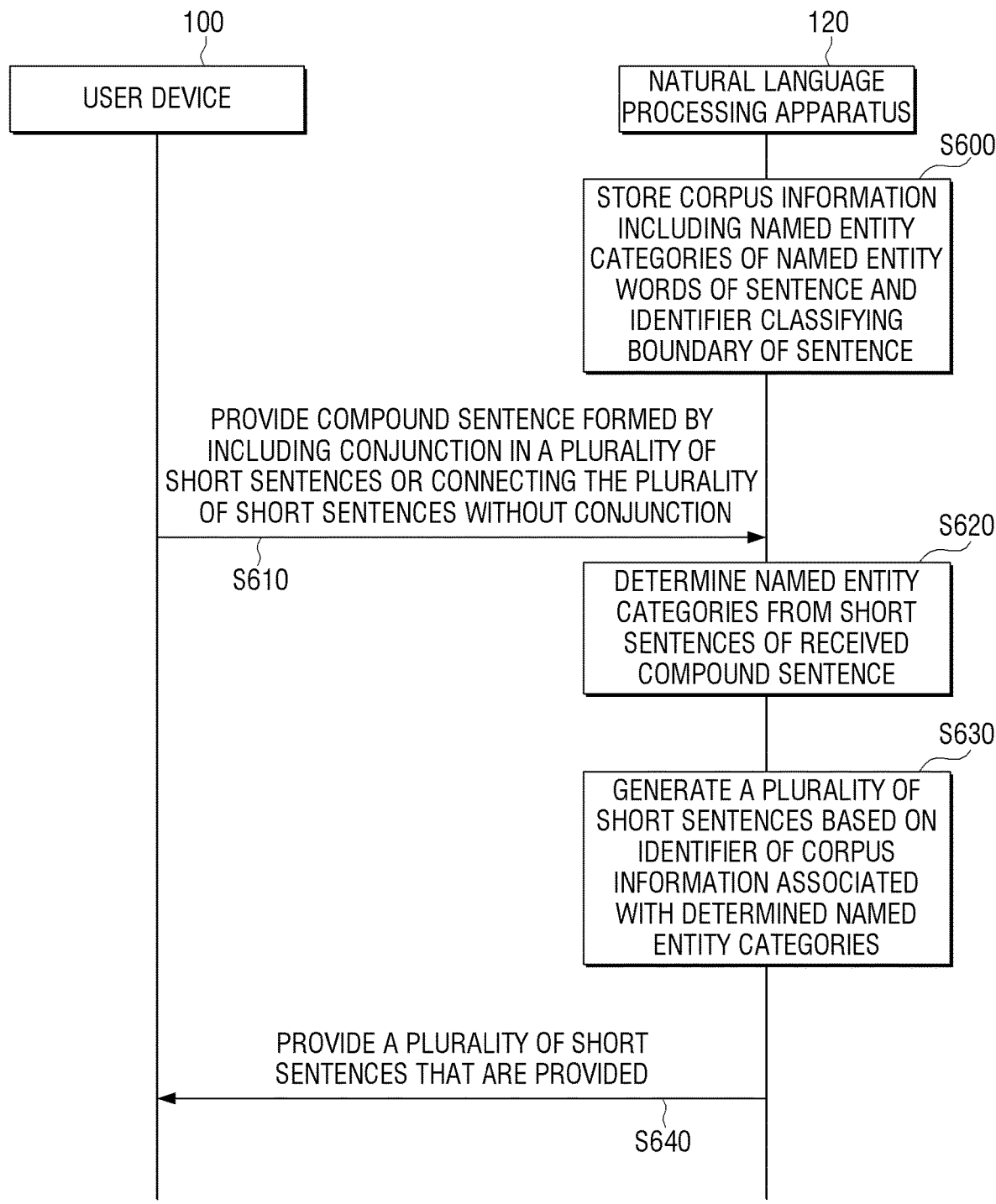
FIG. 6 is a sequence diagram of a process of processing a natural language according to an exemplary embodiment.

FIG. 6 is a sequence diagram illustrating a process of processing a natural language, according to an exemplary embodiment.

Referring to FIG. 6, in operation S600, the natural language processing apparatus 120 according to the exemplary embodiment stores corpus information including named entity categories of words of a sentence and an identifier classifying a boundary of the sentence. Here, the corpus information may be understood as basic and complex sentence parallel corpus information shown in FIG. 3. Operation S600 may include a state where a statistical translation model is trained based on the stored corpus information.

In operation S610, the natural language processing apparatus 120 receives a compound sentence, which is input as a natural language by a user, from the user device 100. Here, the compound sentence refers to a sentence that is formed by including a conjunction in a plurality of short sentences or connecting the plurality of short sentences to one another without the conjunction. Also, the connection between the plurality of short sentences without the conjunction indicates that the plurality of short sentences are consecutively provided at preset time intervals.

In operation S620, the natural language processing apparatus 120 determines a word included in two basic sentences of the received compound sentence, i.e., a named entity category of a named entity. This may be determined by a named entity recognition model that is trained for the input sentence. For example, although "Harry Potter" is included in different compound sentences, "Harry Potter" may be a movie title or a character. Therefore, although there is the same named entity, this named entity category may be accurately determined by the named entity recognition model trained for various types of sentences. Also, if "Harry Potter" and "Gone with the Wind" are respectively included in different compound sentences, "Harry Potter" and "Gone with the wind" may be determined as the same named entity category, i.e., a movie category.

If the named entity category is determined, the natural language processing apparatus 120 acquires corpus information associated with the determined named entity category and generates a plurality of short sentences based on the corpus information in operation S630. In this process, if a named entity attribute of an input compound sentence is determined, the natural language processing apparatus 120 changes a word corresponding to a named entity of the compound sentence into a named entity category. The natural language processing apparatus 120 acquires corpus information by applying the compound sentence including the changed named entity category to a statistical translation model. Here, the output corpus information has the same form as a form where a named entity is changed in the input compound sentence and has a difference in that an identifier such as a sentence classification symbol is included between two sentences.

Therefore, the natural language processing apparatus 120 checks a boundary between two sentences of the input compound sentence based on an identifier classifying sentences, divides the compound sentence into a plurality of short sentences based on the boundary, and restores the compound sentence to an original sentence. This has been sufficiently described with reference to FIGS. 4 and 5 and thus is not described anymore.

In operation S640, the natural language processing apparatus 120 provides the plurality of short sentences to the user device 100. Here, the plurality of short sentences that are provided may have various forms. For example, if the user device 100 processes a voice command like a DTV, a plurality of short sentences may be provided as two short sentences "Record Harry Potter" and "play KBS". Also, in a case of an image display apparatus like a PC performing talking or chatting, the natural language processing apparatus 120 may connect a corresponding sentence to an original conjunction and then re-provide the connected sentence or may translate the sentence into another language and provide the translated sentence. In this case, an operation of respectively translating two short sentences and connecting the translated short sentences by a conjunction may be performed. An original sentence that is divided and then restored as described above may be changed into various forms and then provided to the user device 100.

Figure 7:
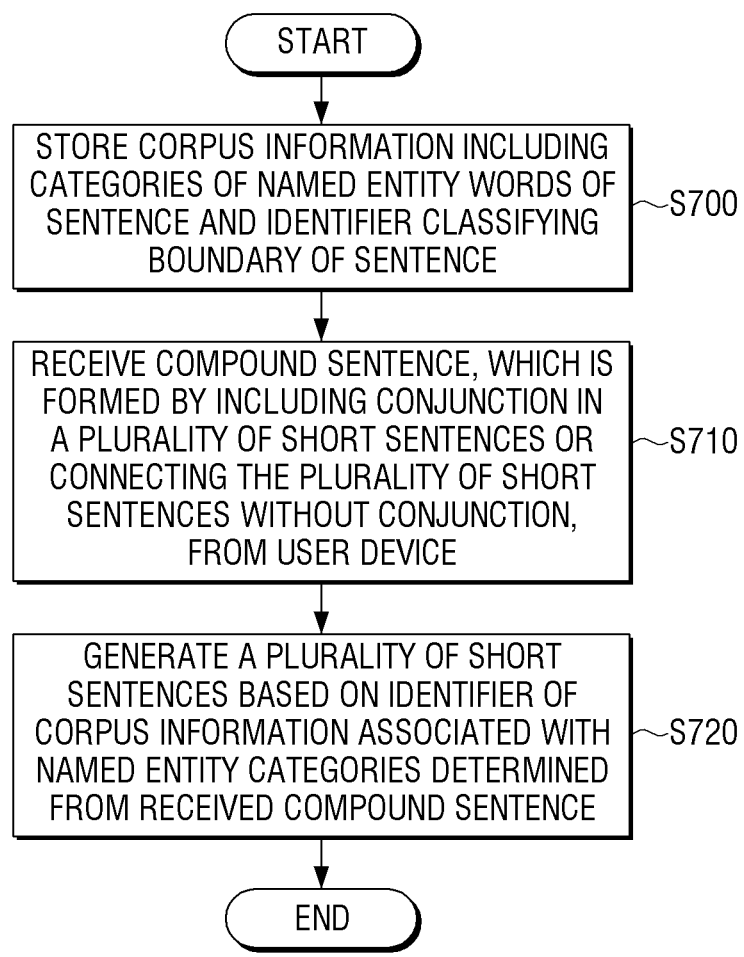
FIG. 7 is a flowchart of a method of processing a natural language, according to an exemplary embodiment.

FIG. 7 is a flowchart of a method of processing a natural language, according to an exemplary embodiment.

For convenience of description, referring to FIG. 7 along with FIG. 6, in operation S700, the natural language processing apparatus 120 stores corpus information including named entity categories of words of a sentence, in more detail, named entity words, and an identifier classifying a boundary of the sentence. Here, the storing includes a state where a statistical translation model is trained based on the stored corpus information.

In operation S710, the natural language processing apparatus 120 receives a compound sentence, which is input as a natural language by a user, from the user device 100. Here, the compound sentence refers to a sentence that is formed by including a conjunction in a plurality of short sentences or connecting the plurality of short sentences without the conjunction. Also, the connection between the plurality of short sentences without the conjunction indicates that the plurality of short sentences are consecutively provided at preset time intervals.

The natural language processing apparatus 120 generates a plurality of short sentences based on the identifier of the corpus information associated with the named entity category determined from the compound sentence in operation S720 and provides the plurality of short sentences to the user device 100.

The other detailed contents associated with FIG. 7 have been sufficiently described with reference to FIG. 6 and thus are omitted.

Figure 8:
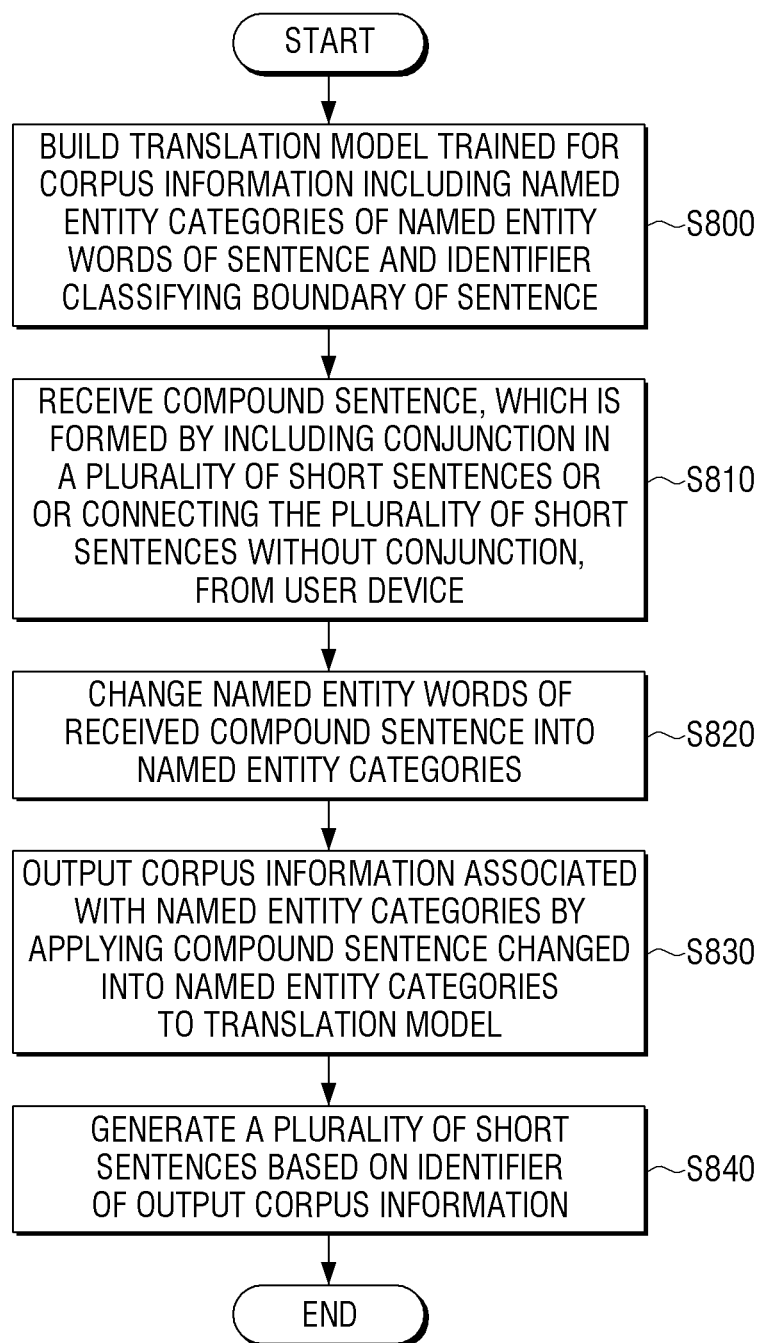
FIG. 8 is a flowchart of a method of processing a natural language, according to another exemplary embodiment.

FIG. 8 is a flowchart of a method of processing a natural language, according to another exemplary embodiment.

For convenience of description, referring to FIG. 8 along with FIG. 6, the natural language processing apparatus 120 according to the present exemplary embodiment builds a translation model trained for corpus information including named entity categories of named entity words of a sentence and an identifier classifying a boundary of the sentence in operation S800.

In operation S810, the natural language processing apparatus 120 receives a compound sentence, which is input as a natural language by a user, from the user device 100. Here, the compound sentence is a sentence that is formed by including a conjunction in a plurality of short sentences, e.g., in first and second short sentences, or connecting the plurality of short sentences without the conjunction. Also, the connection between the plurality of short sentences without the conjunction indicates that the plurality of short sentences are consecutively provided at preset time intervals.

In operation S820, the natural language processing apparatus 120 changes a named entity word of the compound sentence into a named entity category. For example, if named entity words of the compound sentence are different from one another and have the same categories, the named entity words may be referred to as being changed into the same category value. In other words, although named entity words "Gone with the Wind" and "Harry Potter" are different from each other, the named entity words belong to the same category referred to as a movie and thus are changed into "@movie" that is a category value. In the present exemplary embodiment, the compound sentence is divided into two sentences by rapidly estimating a boundary of the sentence, and thus a performance may become faster.

In operation S830, the natural language processing apparatus 120 outputs (or generates) corpus information associated with a named entity category by applying the compound sentence changed into the named entity category to a translation model. Here, the translation model is trained for various types of corpus information to output corpus information associated with the named entity category determined from the input compound sentence.

Also, the natural language processing apparatus 120 divides the input compound sentence based on an identifier of the generated corpus information, i.e., a sentence classification symbol, and restores the input compound sentence to an original sentence. For example, the natural language processing apparatus 120 may divide a compound sentence "Record Harry Potter and play KBS" into two sentences "Record Harry Potter" and "play KBS" based on corpus information and restore the compound sentence to an original sentence, i.e., two short sentences "Record Harry Potter" and "play KBS". The natural language processing apparatus 120 then generates a plurality of short sentences based on the identifier of the corpus information in operation S840 and provides the plurality of short sentences to the user device 100.

As described above, the present exemplary embodiment describes a method of searching for corpus information like searching a DB based on merely named entity category information and generating a plurality of short sentences, i.e., two short sentences, based on the corpus information beyond applying of a named entity model such as a mathematical model and a statistical translation model. However, the present exemplary embodiment may further include any method of checking a named entity category from an input sentence, rapidly checking a boundary between two sentences based the named entity category, and dividing the sentence in order to divide a compound sentence into short sentences.

Processing of a sentence having a form (e.g., short sentence+compound sentence, short sentence+complex sentence, compound sentence+complex sentence) formed by a short sentence, a compound sentence, a complex sentence, and a combination thereof as a plurality of short sentences has been described. However, a plurality of short sentences that are divided and restored may be combined into a compound or complex sentence and provided to the user device 100 of FIG. 1. Therefore, the present exemplary embodiment may not be particularly limited to short sentences as described above.

Figure 9:
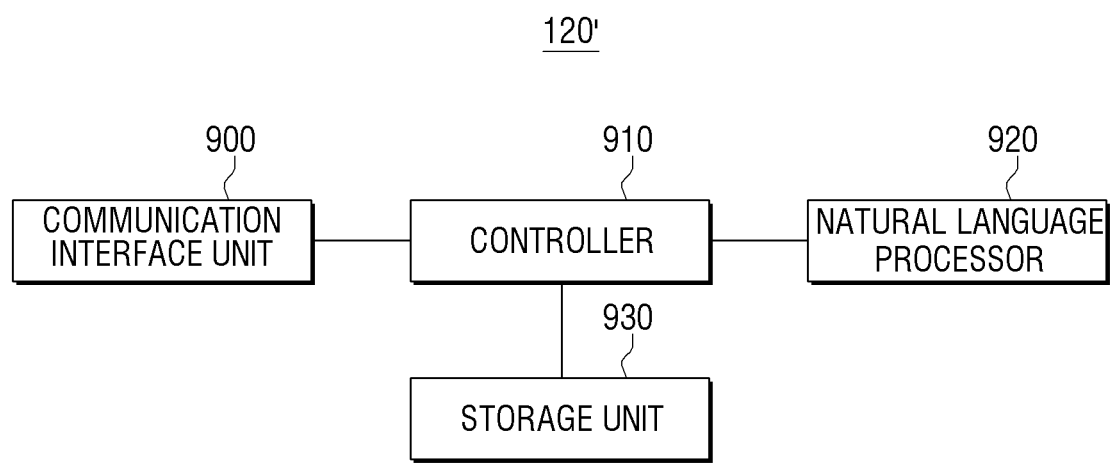
FIG. 9 is a block diagram of a detailed configuration of a natural language processing apparatus, according to another exemplary embodiment.
Figure 10:
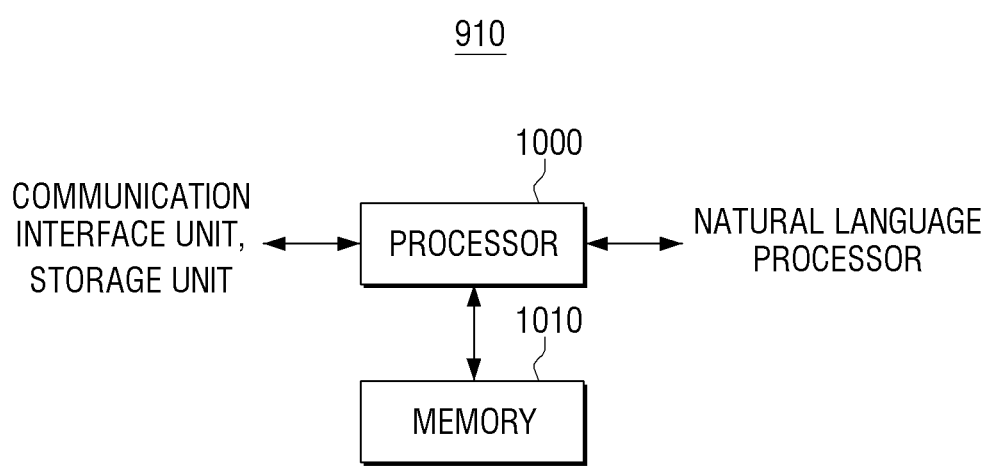
FIG. 10 is a block diagram of a configuration of a controller of FIG. 9, according to an exemplary embodiment.

FIG. 9 is a block diagram of a detailed configuration of a natural language processing apparatus 120', according to another exemplary embodiment. FIG. 10 is a block diagram of a configuration of a controller of FIG. 9, according to an exemplary embodiment.

As shown in FIG. 9, the natural language processing apparatus 120' according to the present exemplary embodiment includes some or all of a communication interface unit 900, a controller 910, a natural language processor 920, and a storage unit 930.

Here, the inclusion of some or all of elements means that some elements such as the storage unit 930 may be omitted or some elements such as the natural language processor 920 may be integrated with another element such as the controller 910. All of the elements will be described as being included to help sufficient understanding of the exemplary embodiments.

In comparison between the natural language processing apparatus 120' of FIG. 9 and the natural language processing apparatus 120 of FIG. 2, the natural language processor 210 of FIG. 2 realizes a control function and a natural processing function as software. However, the controller 910 and the natural language processor 920 are physically separated from each other, and thus the controller 910 performs a control operation, and the natural language processor 920 performs an operation for natural language processing, i.e., an operation for a voice recognition.

Here, the controller 910 may include a processor 1000 such as a CPU and a memory 1010 as shown in FIG. 10. Therefore, as described above, the natural language processing apparatus 120' may load a program stored in the natural language processor 920 into the memory 1010, and the processor 1000 may perform a natural language processing operation by executing the program loaded into the memory 1010. As a result, a data processing speed becomes faster. Here, the memory 1010 may include a random access memory (RAM) that is a volatile memory.

In the natural language processing apparatus 120' according to the present exemplary embodiment, the controller 910 may not include the memory 1010. In this case, the controller 910 may execute the natural language processor 920, may be provided with a processing result, and process the processing result.

As described above, the natural language processing apparatus 120' according to the present exemplary embodiment may have various types of configurations and perform various types of operations and thus may not be particularly limited to the above-described contents.

In other words, according to various exemplary embodiments, an operation may be variously changed according to a case where the user device and the natural language processing apparatus 120 of FIG. 1 respectively include voice recognition engines (e.g., fixed utterance engines, free utterance engines, or the like), a case where the user device 100 includes merely some of a voice recognition engine, and whether merely the natural language processing apparatus 120 includes a recognition engine. For example, if the user device 100 include merely some of the voice recognition engine, the user device 100 of FIG. 1 may provide a text-based recognition result or may include an engine that may perform operations, etc. of performing whether operations intended by a user are sequentially performed. Therefore, the present exemplary embodiment may not particularly limit which subject performs which operation.

Figure 11:
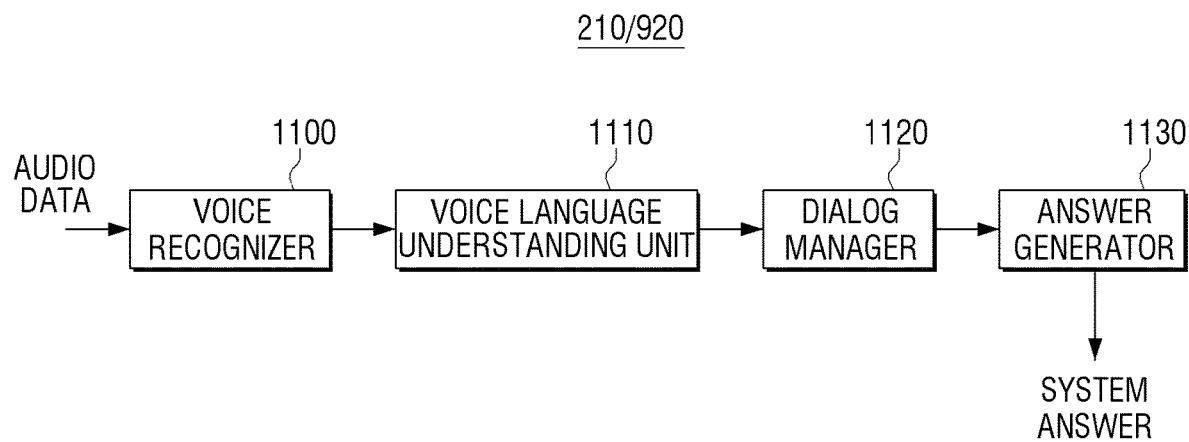
FIG. 11 is a block diagram of a detailed configuration of a natural language processor of FIG. 2 or 9, according to an exemplary embodiment.
Figure 12:
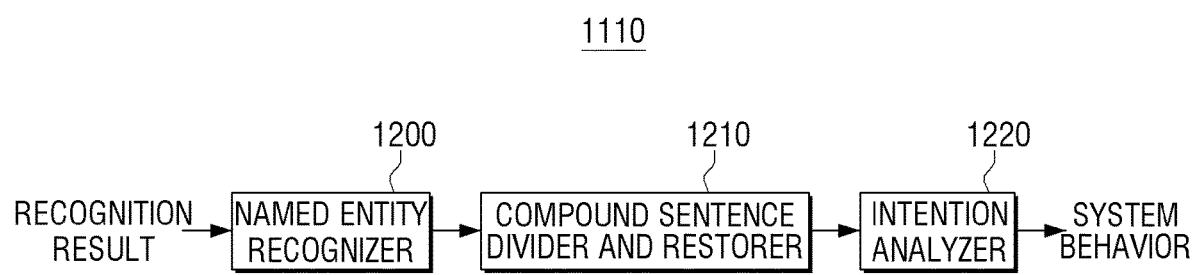
FIG. 12 is a block diagram of a detailed configuration of a voice language understanding unit of FIG. 11, according to an exemplary embodiment.
Figure 13:
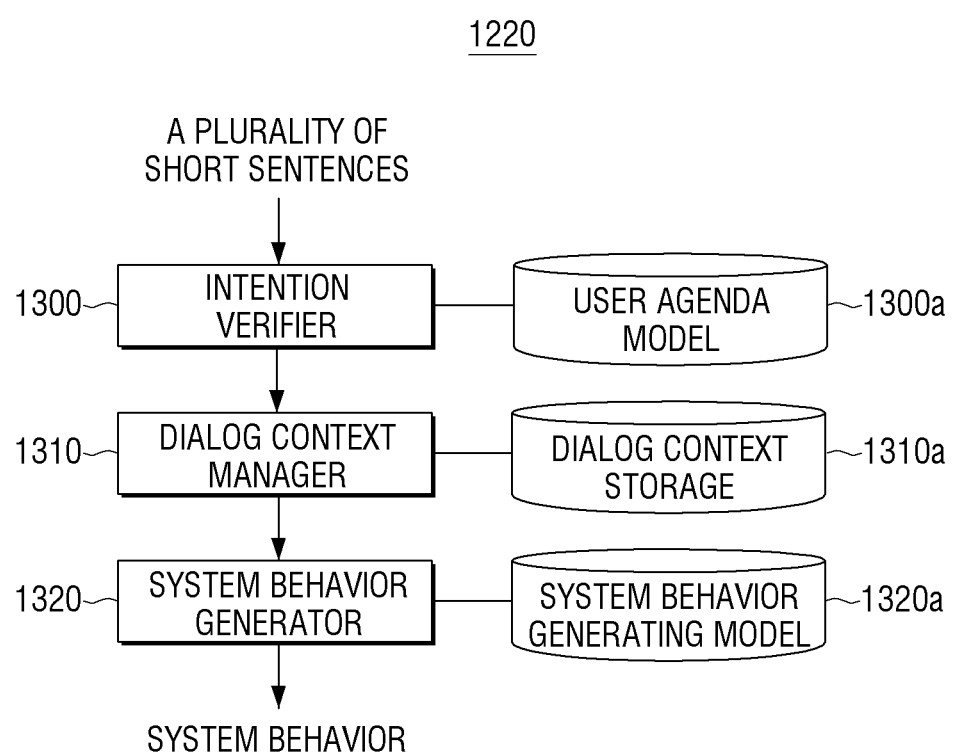
FIG. 13 is a block diagram of a detailed configuration of an intention analyzer of FIG. 12, according to an exemplary embodiment.
Figure 14:
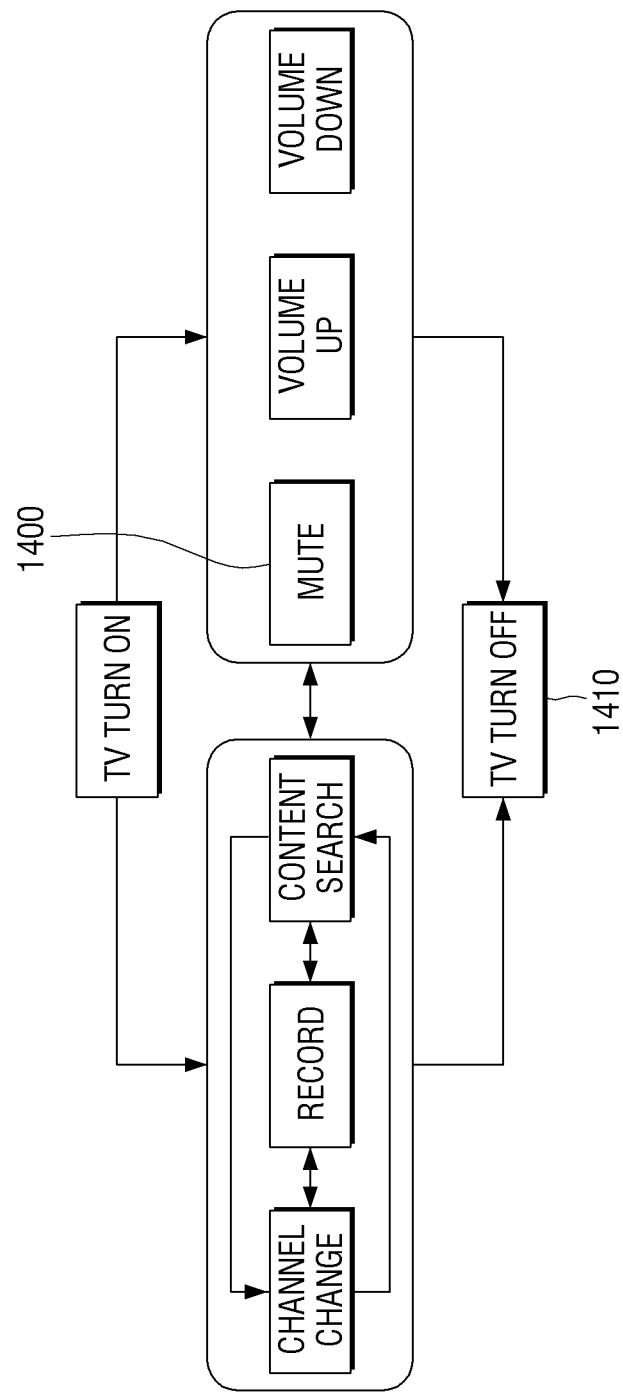
FIG. 14 is a block diagram of a user agenda model of a TV domain, according to an exemplary embodiment of the present invention.

FIG. 11 is a block diagram of a detailed configuration of the natural language processor 210 or 910 of FIG. 2 or 9, according to an exemplary embodiment. FIG. 12 is a block diagram of a detailed configuration of a voice language understanding unit of FIG. 11, according to an exemplary embodiment. FIG. 13 is a block diagram of a detailed configuration of an intention analyzer of FIG. 12, according to an exemplary embodiment. FIG. 14 is a block diagram of a user agenda model of a TV domain, according to an exemplary embodiment.

For convenience of description, referring to FIG. 11 along with FIG. 9, the natural language processor 920 according to the present exemplary embodiment may include some or all of a voice recognizer (module) 1100, a voice language understanding unit (module) 1110, a dialog manager (module) 1120, and an answer generator (module) 1130 and may further include a voice synthesizer.

Here, the inclusion of some or all of elements means that some elements may be omitted or may be integrated with another element. For example, some modules of software may be configured as hardware, and some of hardware may be configured as software (e.g., a registry and a memory). Therefore, all of the elements will be described as being included for convenience of description.

If a voice command uttered by a user is input from the user device 100 of FIG. 1, the voice recognizer 1100 may output a text-based recognition result of the voice command. The text-based recognition result may not be particularly limited to a form of a language. In other words, if audio data received from the user device 100 is analyzed, the audio data may be output in a Hangeul form in Hangeul by the analysis of the audio data and may be output in an English form in English. If English matches Hangeul, Hangeul may be recognized, but English may be output. Therefore, the audio data may not be particularly limited to a form of a language.

The voice language understanding unit 1110 performs an operation of changing a language into a form understandable by a machine by performing a linguistics analysis or the like such as analyses of parts of speech and a dependency structure of an utterance recognition result of a user. A voice language understanding result may mainly include an intention of the user and a named entity that is information essential for the intention. For example, the intention of the user may "search start time (search for broadcasting time), and the named entity may be a form of "title=Muhan Challenge" for an utterance "When Muhan Challenge will start?" in a TV program search dialog interface.

As sufficiently described above, the voice language understanding unit 1110 according to the present exemplary embodiment first performs a named entity recognition and, if an input text-based recognition result is a compound sentence, analyzes two user intentions through a compound sentence division.

For this, the voice language understanding unit 1110 may include some or all of a named entity recognizer (module) 1200, a compound sentence divider and restorer (module) 1210, and an intention analyzer (module) 1220 as shown in FIG. 12. Here, the inclusion of some or all of elements is the same as the above-described meaning.

As sufficiently described above, the named entity recognizer 1200 will now be described in brief. The named entity recognizer 1200 extracts a named entity from a voice command of a compound sentence form uttered by the user. For example, named entities "Muhan Challenge" and "KBS" in a sentence "Alarm-reserve Muhan Challenge and play KBS" and respectively indicates a title and a channel name of a content. The named entity recognizer 1200 extracts this information.

For example, as described above, the compound sentence divider and restorer 1210 may divide a compound sentence into short sentences by using a statistical translation method. For example, the compound sentence divider and restorer 1210 performs a function of dividing and restoring a compound sentence "Alarm-reserve Muhan Challenge and play KBS" into two short sentences. In other words, two short sentences "Alarm-reserve Muhan Challenge" and "play KBS" may be output as a result. Other detailed contents have been sufficiently described above and thus are omitted herein.

The intention analyzer 1220 analyzes intentions of two short sentences that are divided. In other words, operations intended by the user may be regarded as being determined.

The dialog manager 1120 performs a process of generating the most appropriate behavior taken by an interface based on the voice language understanding result. For this, a context of a dialog is maintained to infer a meaning of a user utterance in a dialog situation and generate the most appropriate system behavior in order to achieve a purpose of the user. For example, when the user utters "Record Muhan Challenge", a system extracts "record" and a named entity "title=Muhan Challenge" through a language understanding process, and generates a series of system behaviors such as searching for Muhan Challenge, search result outputting, and Muhan Challenge recording through a dialog management.

Also, the dialog manager 1120 according to the present exemplary embodiment determines whether two operations analyzed by the intention analyzer 1120 are sequentially performable and generates a system behavior according to the determination result.

For example, if the two operations are sequentially performable, two tasks are stored (e.g., pushed) in a storage (e.g., a stack) storing tasks. If one task is performed, and several sub-tasks are performed to perform the one task, the sub-tasks are stored in the storage. If there is no task stored in the storage, an operation ends. If the two tasks are sequentially unperformable, a warning message may be output, and only one task that is first input may be performed.

In order to perform the above-described functions, as shown in FIG. 13, the dialog manager 1120 may include some or all of an intention verifier (module) 1300, a dialog context manager (module) 1310, and a system behavior generator (module) 1320 and may further include some or all of a user agenda model 1300*a*, a dialog context storage 1310*a*, and a system behavior generation module 1320*a*.

The intention verifier 1300 determines whether operations intended by a user are sequentially performable in two short sentences. For this, the intention verifier 1300 determines whether given two operations are sequentially performable, with reference to the user agenda model 1300*a* as shown in FIG. 13. The user agenda model 1300*a* stores operation information about sequentially performable operations (or functions). The user agenda model 1300*a* is formed in a graph form, a node of the graph is a function wanted by the user, i.e., an intention of the user, an edge of the graph has a directivity, and node A is connected to node B merely if the nodes A and B are sequentially generated.

As shown in FIG. 14, the user requests operations from a TV in order of arrows. Therefore, an utterance "Turn off TV and mute" is not appropriate. In other words, as shown in FIG. 14, in the user agenda model 1300*a*, a direction of an arrow is set from a mute function 1400 to a TV turn-off function 1410. Therefore, the intention verifier 1300 may determine that the operations are sequentially unperformable based on the direction (or direction information).

An example of dialog processing of a compound sentence that is determined to be sequentially performable by the intention verifier 1300 is illustrated below. Here, S indicates a sub-dialog.

U: Alarm-reserve Muhan Challenge and play KBS
S: (Two of Muhan Challenge have been searched)
The following is searched. Select one.
U: Reserve first thing.
S: Time when "Muhan Challenge" is broadcast will show you at ∘∘ o'clock ∘∘ minutes.
S: Channel will be changed into KBS.
(Change channel into KBS)

Also, an example of processing of a compound that is determined to be sequentially unperformable by the intention verifier 1300 will be illustrated below.

U: Turn off TV and mute
S: S: Unperformable operation is included. Do you want to turn off TV?
(Output error message and perform merely function of turning off TV)
U: Yes
S: (TV ends)

Also, the dialog context manager 1310 determines an operation intended by the user by using a dialog history. In other words, the dialog context manager 1310 determines an operation currently intended by the user through a dialog context by using the dialog history. For example, an operation intended by the user in a short sentence may include a demonstrative pronoun. As described above, in a compound sentence "Reserve Muhan Challenge and play it", "it" may designate "Muhan Challenge", "channel", or the like. Therefore, the dialog context manager 1310 may determine this by using a dialog history. In this process, the dialog context manager 1310 may further perform a system answer process to determine an operation intended by the user. In other words, the dialog context storage 1310*a* may store a user intention analysis result, the dialog history, etc., i.e., may store various types of information associated with the dialog context manager 1310. The dialog context storage 1310*a* may also output stored information so as to generate a system answer. Here, the system answer corresponds to a process of questioning the user and receiving an answer of the user to the question. In this point, the above sub-dialog may correspond to the system answer.

The system behavior generator 1320 generates a system behavior for satisfying a user intention in consideration of the dialog context. For example, the system behavior generator 1320 generates the system behavior based on the system behavior generation module 1320*a* when generating the system behavior. Also, the system behavior generation module 1320*a* may store information about an operation intended by the user and a behavior the most appropriate for a current situation. For example, the information may be associated with whether to provide one search result or two search results.

Lastly, the answer generator 1130 of FIG. 11 generates an answer "Two of Muhan Challenge have been searched", "Do you want to shift channel?", or the like in the above dialog. The answer as generated above may be provided to the user device 100 of FIG. 1.

In addition, the natural language processor 920 of FIG. 9 may further include a voice synthesizer (not shown). In other words, if the generated answer is to be provided along with a voice, the natural language processor 920 may synthesize a preset voice through the voice synthesizer and provide the synthesized voice to the user device 100.

Figure 15:
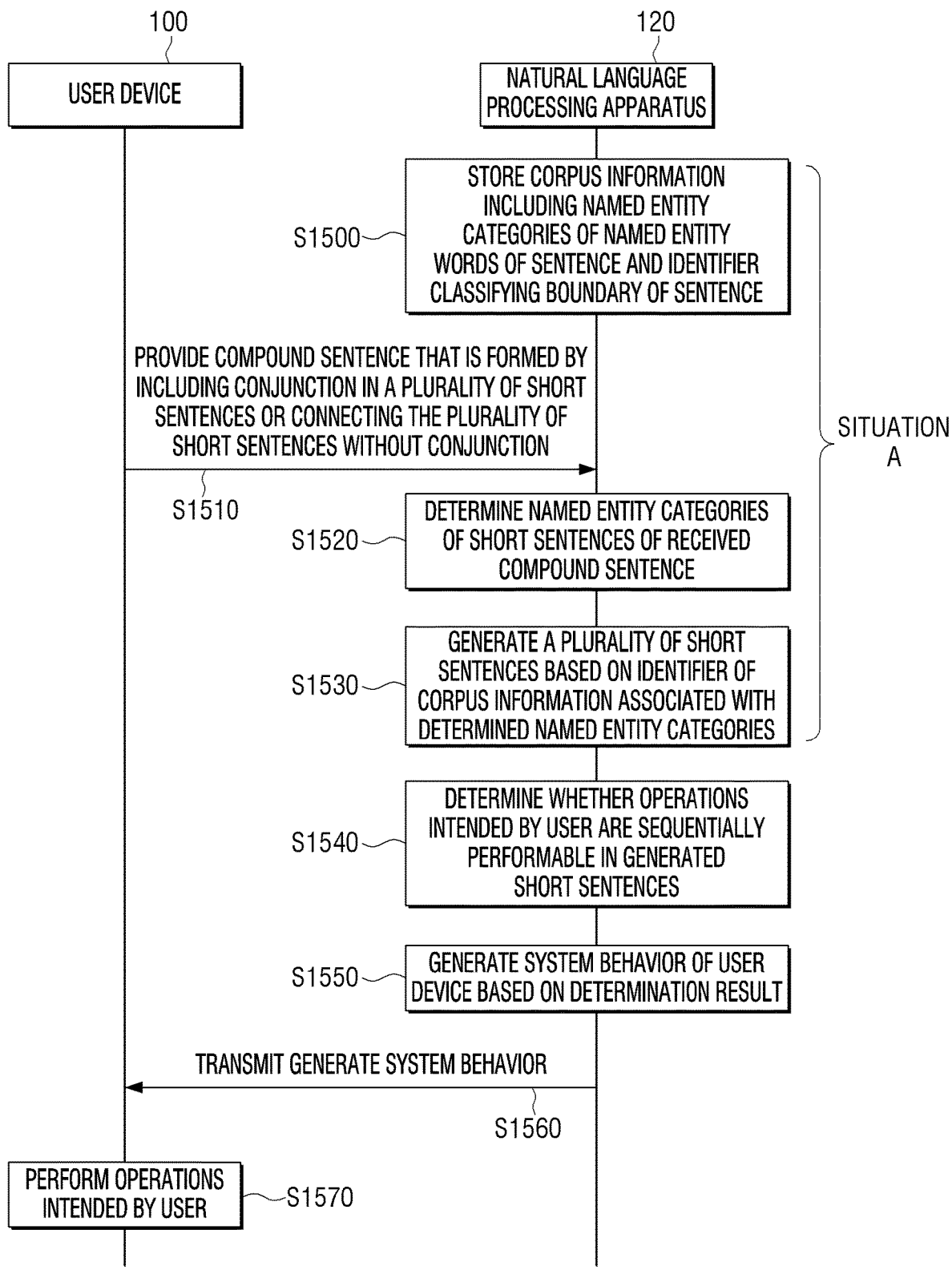
FIG. 15 is a sequence diagram illustrating a process of processing a natural language, according to another exemplary embodiment.

FIG. 15 is a sequence diagram illustrating a process of processing a natural language, according to another exemplary embodiment, i.e., illustrates the natural language processing apparatus 120 of FIG. 1 including a free utterance engine, etc.

For convenience of description, referring to FIG. 15 along with FIG. 6, if there is a user utterance of a compound sentence form from the user device 100, the natural language processing apparatus 120 according to the present exemplary embodiment may perform operations S1500, S1510, S1520, and S1530 so as to correspond to operations S600, S610, S620, and 630 of FIG. 6, respectively. Detailed contents of FIG. 15 will be replaced with contents of FIG. 6.

In operation S1540, the natural language processing apparatus 120 determines whether operations intended by a user are sequentially performable in generated short sentences.

In operation S1550, the natural language processing apparatus 120 generates a system behavior of the user device 100 based on the determination result. When generating the system behavior, the natural language processing apparatus 120 may process data under regulations with the user device 100. In other words, if the natural language processing apparatus 120 provides contents of a message, the user device 100 merely displays the received message. If the natural language processing apparatus 120 transmits information for forcing a message of any information to be displayed, the user device 100 may generate and display a message based on the received information. In this process, the user device 100 may operate a graphical user interface (GUI) generator for generating a message.

In operation S1560, the natural language processing apparatus 120 transmits the generated system behavior to the user device 100.

In operation S1570, the user device 100 performs an operation intended by the user based on the received system behavior. For example, if the system behavior is a message output, a message is output. If the system behavior is an operation of turning off a TV, the TV is turned off. According to the present exemplary embodiment, the user device 100 may sequentially perform a plurality of operations for a voice command of a compound sentence form uttered by the user. For example, the user device 100 may perform sequential operations such as "Reserve Muhan Challenge" and "change channel KBS".

A statistics-based intention analysis based on corpus information has been described as an example according to an exemplary embodiment. However, a rule-based intention analysis method may be used in the exemplary embodiment.

Also, in the present exemplary embodiment, an operation intended by the user may be determined by dividing a compound sentence into two short sentences, and a system behavior may be generated based on the operation. For example, if whether a plurality of operations intended by the user are sequentially performable in the compound sentence is determined, the present exemplary embodiment may not particularly limit dividing of the compound sentence into short sentences and using of the short sentences.

Figure 16:
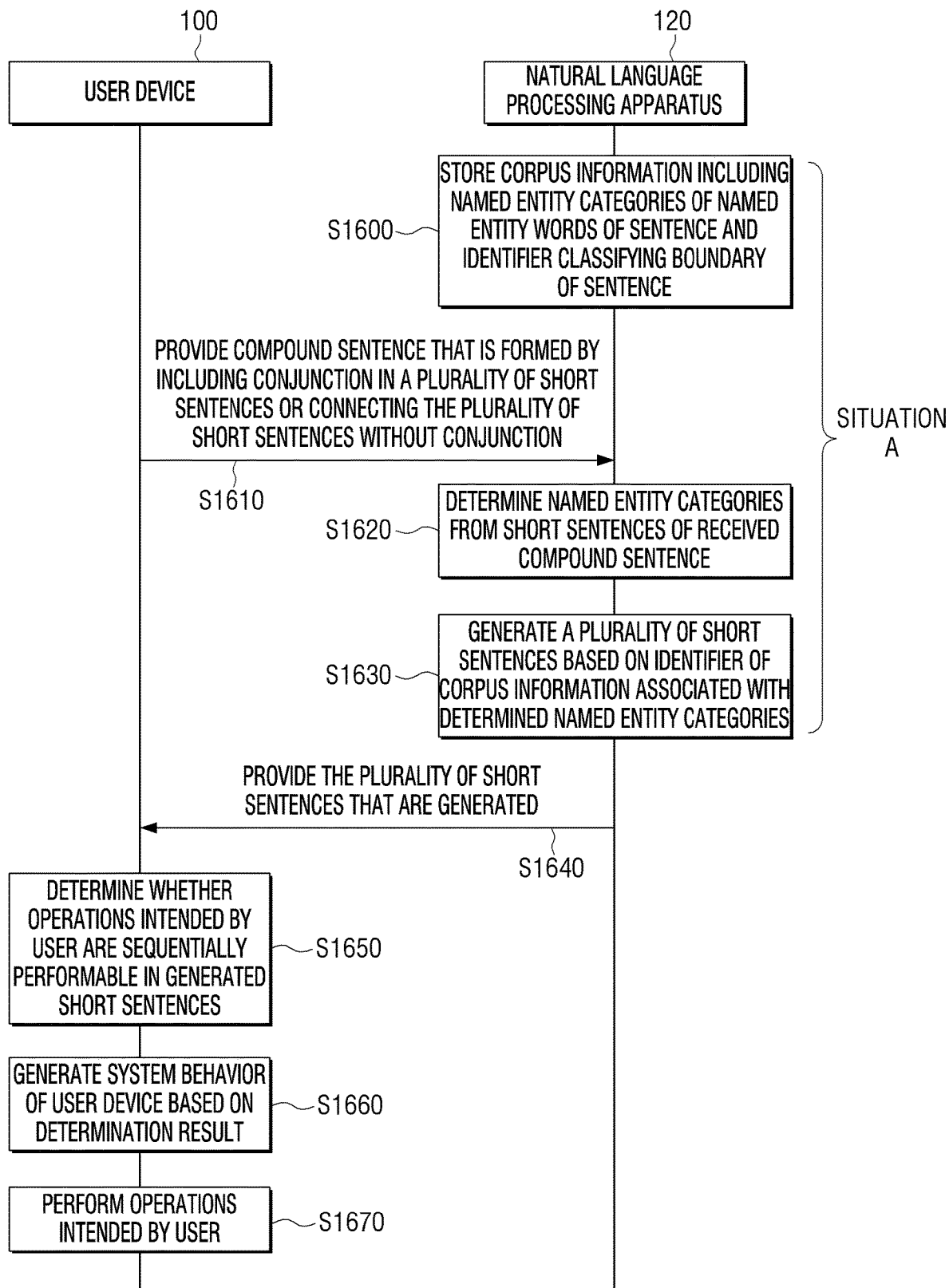
FIG. 16 is a sequence diagram illustrating a process of processing a natural language, according to another exemplary embodiment.

FIG. 16 is a sequence diagram illustrating a process of processing a natural language, according to another exemplary embodiment, i.e., illustrates the user device 100 of FIG. 1 including some of a free utterance engine.

In comparison between FIGS. 16 and 15, the process of processing the natural language according to the present exemplary embodiment is different from the processes of processing the natural language according to the previous exemplary embodiment in that the user device 100 may directly perform operations S1540, S1550, and S1570 of FIG. 15.

Therefore, except for this point, the process of FIG. 16 is not greatly different from the processes of FIGS. 6 and 15 and thus is replaced with contents of the processes of FIGS. 6 and 15. That is, the natural language processing apparatus 120 according to the present exemplary embodiment may perform operations S1600, S1610, S1620, S1630, S1640, S1650, S1660, and S1670 so as to correspond to operations S1500, S1510, S1520, S1530, S1540, S1550, S1560, and S1570 of FIG. 15, respectively.

Figure 17:
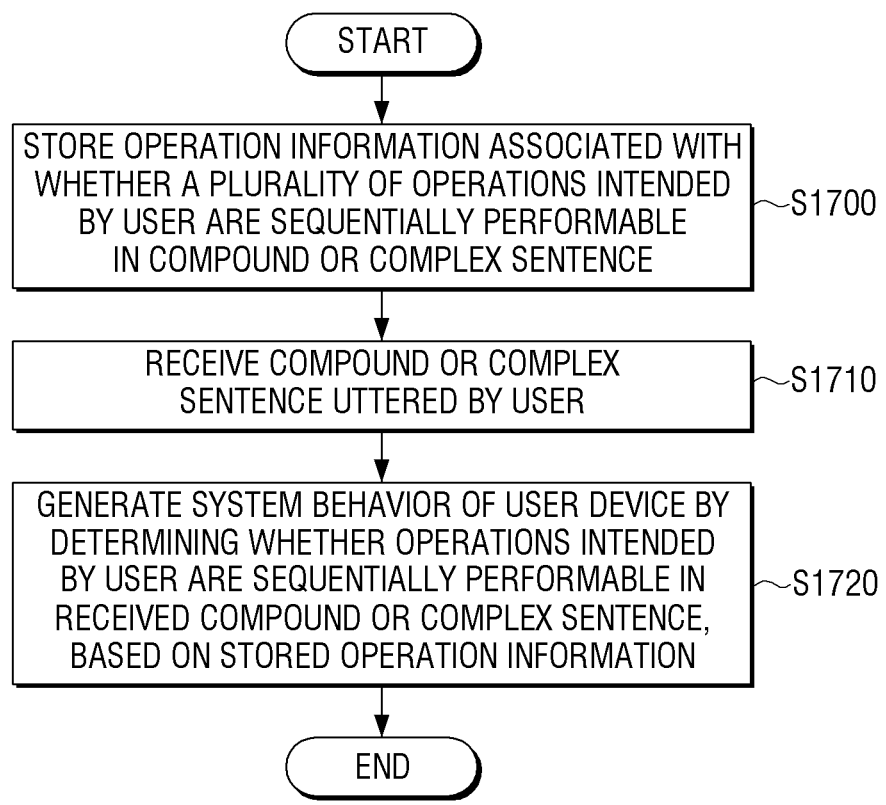
FIG. 17 is a flowchart of a method of processing a natural language, according to another exemplary embodiment.

FIG. 17 is a flowchart of a method of processing a natural language, according to another exemplary embodiment.

For convenience of description, referring to FIG. 17 along with FIG. 1, the natural language processing apparatus 120 stores operation information associated with whether operations intended by a user are sequentially performable in a compound sentence or a complex sentence in operation S1700. Here, the stored operation information may include direction information setting directions between a plurality of operations.

In operation S1710, the natural language processing apparatus 120 may receive a compound sentence or a complex sentence uttered by the user from the user device 100.

In operation S1720, the natural language processing apparatus 120 generates a system behavior of the user device 100 by determining whether operations intended by the user are sequentially performable in the compound or complex sentence based on the stored operation information.

Operations performed in the natural language processing apparatus 120 have been described with reference to FIG.

17. However, operations S1700 through S1720 may be performed in the user device 100 that operates in a stand-alone form as shown in FIG. 1. Here, the "stand-alone form" means that operations may be independently performed without being performed along with the natural language processing apparatus 120 or the like. Therefore, a process of operating the user device 100 may be replaced with the contents of FIG. 17.

Figure 18:
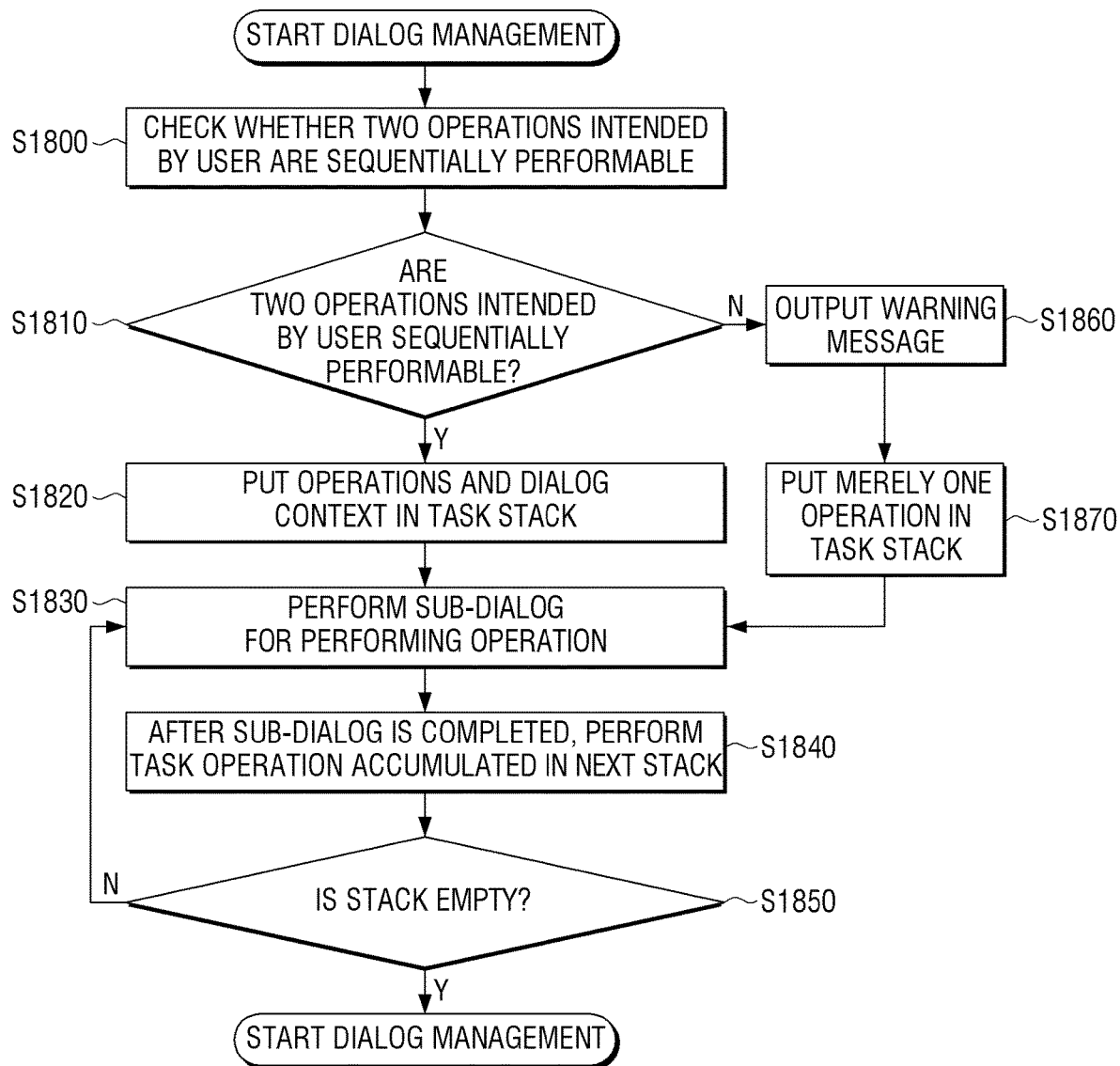
FIG. 18 is a flowchart of a method of processing a natural language, according to another exemplary embodiment.

FIG. 18 is a flowchart of a method of processing a natural language, according to another exemplary embodiment.

For convenience of description, referring to FIG. 18 along with FIG. 1, the natural language processing apparatus 120 according to the present exemplary embodiment checks whether two operations intended by a user are sequentially performable according to a voice command of a compound sentence form uttered by the user in operation S1800. For example, the natural language processing apparatus 120 may set the user agenda model 1300a as described with reference to FIG. 14.

If the natural language processing apparatus 120 determines whether the two operations are sequentially performable in operation S1810, the natural language processing apparatus 120 stores the two operations and a dialog context (or data) in a storage in operation S1820. Also, the two operations and the dialog context may be expressed as being stored as software in a task stack.

In operation S1830, the natural language processing apparatus 120 may perform a sub-dialog to perform an operation. If a previous operation is completed, the natural language processing apparatus 120 may perform a subsequent operation in operation S1840. For example, there may be "Reserve Muhan Challenge and play KBS". Therefore, a sub-dialog may be performed for reserving "Muhan Challenge", and if this process is completed, an operation for playing "KBS" may be performed.

If a plurality of operations are completed in operation S1850 according to this process, the natural language processing apparatus 120 ends operations.

If it is determined in operation S1810 that the two operations are sequentially unperformable, the natural language processing apparatus 120 generates and outputs a warning message in operation S1860. In operation S1870, the natural language processing apparatus 120 stores merely one operation in a storage. In other words, the natural language processing apparatus 120 may perform merely a previous operation.

Therefore, if a sub-dialog is required, the natural language processing apparatus 120 may perform operations before operation S1830.

An operation of the natural language processing apparatus 120 has been described with reference to FIG. 18. However, as in FIG. 17, operations of FIG. 18 may be performed in the user device 100 of FIG. 1. Therefore, a process of operating the user device 100 will be replaced with contents of FIG. 18.

Although all of elements configuring the exemplary embodiments are described as being combined into one and then operate, the exemplary embodiments are not limited thereto. In other words, all of the elements may be selectively combined into one or more and then operation within the scope of the exemplary embodiments. Also, each of the elements may be embodied as one independent piece of hardware. However, some or all of the elements may be selectively combined to be embodied as a computer program having a program module performing functions of some or all of the combined elements. Codes and code segments configuring the computer program may be easily inferred by those skilled in the art. The computer program may be stored on a non-transitory computer readable medium, and read and executed by a computer so as to embody the exemplary embodiments.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus for processing a natural language, the apparatus comprising:
    a memory that stores operation information describing whether certain operations are sequentially performable;
    a communication interface; and
    a processor configured to:
        obtain, via the communication interface, a compound or complex sentence uttered by a user corresponding to a plurality of operations including a first operation and a second operation intended by the user;
        divide the obtained compound or complex sentence into a plurality of shorter sentences;
        identify whether the operations intended by the user in each of the plurality of shorter sentences are sequentially performable operations; and
        based on identifying that the operations intended by the user are sequentially performable operations, generate a plurality of control commands corresponding to the operations intended by the user, based on the operation information stored in the memory; and
        based on identifying that the operations intended by the user are not sequentially performable, output information that indicates that at least one of the operations intended by the user is not performable, wherein the processor is further configured to identify whether the second operation is performable in a status of the apparatus if the first operation is performable in the apparatus.

2. The apparatus of claim 1, wherein each of the plurality of shorter sentences is a basic sentence.

3. The apparatus of claim 1, wherein the processor is further configured to:
    based on the operations intended by the user in each of the plurality of shorter sentences being identified as being sequentially performable, identify the operations intended by the user in each of the plurality of shorter sentences based on a dialog context of the operations and a stored dialog history, and generate the control commands corresponding to the identified operations.

4. The apparatus of claim 3, wherein the processor is configured to generate a system answer for performing a sub-dialog with the user to identify the operations.

5. The apparatus of claim 3, wherein based on the operations intended by the user in each of the plurality of shorter sentences being identified as not being sequentially performable, the processor is configured to generate a control command for outputting a warning message and to generate a control command for performing only one operation from among the operations intended by the user in each of the plurality of shorter sentences.

6. The apparatus of claim 3, wherein the processor is further configured to, based on a voice signal corresponding to a control command being provided to the user, synthesize the control command and the voice signal.

7. The apparatus of claim 1, wherein the memory further stores direction information which describes an order in which the certain operations are sequentially performable.

8. The apparatus of claim 1, wherein
among the plurality of shorter sentences, a first short sentence corresponding to the first operation is received before a second short sentence corresponding to the second operation, and
if the second operation is not performable in the apparatus after performing the first operation, the processor is configured to identify that the second operation is not sequentially performable with the first operation, and generate a control command for performing only the first operation among the first operation and the second operation intended by the user.

9. A method of processing a natural language, the method comprising:
storing operation information in a memory, the operation information describing whether certain operations are sequentially performable;
obtaining, via a communication interface, a compound or complex sentence uttered by a user corresponding to a plurality of operations including a first operation and a second operation intended by the user;
dividing the obtained compound or complex sentence into a plurality of shorter sentences;
identifying whether the operations intended by the user in each of the plurality of shorter sentences are sequentially performable operations;
based on identifying that the operations intended by the user are sequentially performable operations, generating a plurality of control commands corresponding to the operations intended by the user, based on the operation information stored in the memory;
identifying whether the second operation is performable in a status of an apparatus if the first operation is performable in the apparatus; and
based on the operations intended by the user in each of the plurality of shorter sentences not being sequentially performable, outputting information that indicates that at least one of the operations intended by the user is not performable.

10. The method of claim 9, wherein each of the plurality of shorter sentences is a basic sentence.

11. The method of claim 9, further comprising:
based on the operations intended by the user in each of the plurality of shorter sentences being identified as being sequentially performable, identifying the operations intended by the user in each of the plurality of shorter sentences based on a dialog context of the operations and a stored dialog history; and
generating the control commands corresponding to the identified operations.

12. The method of claim 11, wherein the generating the control command comprises generating a system answer for performing a sub-dialog with the user to identify the operations.

13. The method of claim 11, wherein the generating of the control command comprises, based on the operations intended by the user in each of the plurality of shorter sentences being identified as not being sequentially performable, generating a control command for outputting a warning message and generating a control command for performing only one operation from among the operations intended by the user in each of the plurality of shorter sentences.

14. The method of claim 11, further comprising:
based on a voice signal corresponding to a control command being provided to the user synthesizing the control command and the voice signal.

15. The method of claim 11, wherein
among the plurality of shorter sentences, a first short sentence corresponding to the first operation is received before a second short sentence corresponding to the second operation, and
the method further comprises if the second operation is not performable in the apparatus after performing the first operation, identifying that the second operation is not sequentially performable with the first operation, and generating a control command for performing only the first operation among the first operation and the second operation intended by the user.

16. The method of claim 9, wherein the storing comprises storing direction information which describes an order in which the certain operations are sequentially performable.

17. A non-transitory computer readable recording medium comprising a program for executing a method of processing a natural language, wherein the method comprises:
storing operation information in a memory, the operation information describing whether certain operations are sequentially performable;
obtaining, via a communication interface, a compound or complex sentence uttered by a user corresponding to a plurality of operations including a first operation and a second operation intended by the user;
dividing the obtained compound or complex sentence into a plurality of shorter sentences;
identifying whether the operations intended by the user in each of the plurality of shorter sentences are sequentially performable operations;
based on identifying that the operations intended by the user are sequentially performable operations, generating a plurality of control commands corresponding to the operations intended by the user, based on the operation information stored in the memory;
identifying whether the second operation is performable in a status of an apparatus if the first operation is performable in the apparatus; and
based on the operations intended by the user in each of the plurality of shorter sentences not being sequentially performable, outputting information that indicates that at least one of the operations intended by the user is not performable.

18. The non-transitory computer readable recording medium of claim 17, wherein
among the plurality of shorter sentences, a first short sentence corresponding to the first operation is received before a second short sentence corresponding to the second operation, and
the method further comprises if the second operation is not performable in the apparatus after performing the first operation, identifying that the second operation is not sequentially performable with the first operation, and generating a control command for performing only the first operation among the first operation and the second operation intended by the user.

\* \* \* \* \*